US006805332B2

(12) United States Patent
Crawley

(10) Patent No.: US 6,805,332 B2
(45) Date of Patent: Oct. 19, 2004

(54) INFLATABLE SEAT VALVE

(76) Inventor: Michael F. Crawley, 317 Calderwood Hwy., Maryville, TN (US) 37801

( * ) Notice: Subject to any disclaimer, the term of this patent is extended or adjusted under 35 U.S.C. 154(b) by 113 days.

(21) Appl. No.: 10/113,021

(22) Filed: Mar. 29, 2002

(65) Prior Publication Data

US 2003/0183796 A1 Oct. 2, 2003

(51) Int. Cl.$^7$ .............................................. F16K 25/00
(52) U.S. Cl. ...................................... 251/172; 251/249.5
(58) Field of Search .................................. 251/170, 172, 251/175, 192, 248, 249.5, 315.01

(56) References Cited

U.S. PATENT DOCUMENTS

| | | | |
|---|---|---|---|
| 2,705,016 A | | 3/1955 | Saar |
| 4,137,935 A | | 2/1979 | Snowdon |
| 4,292,992 A | | 10/1981 | Bhide |
| 4,353,388 A | | 10/1982 | Isoyama et al. |
| 4,583,568 A | * | 4/1986 | Yamakawa et al. ......... 137/240 |
| 4,688,594 A | | 8/1987 | Gardner |
| 4,715,400 A | | 12/1987 | Gardner et al. |
| 5,642,751 A | | 7/1997 | Crawley |
| 5,717,135 A | * | 2/1998 | Fiorletta et al. ........... 73/146.5 |

OTHER PUBLICATIONS

Macawber—Denseveyor brochure, 4 pages, 1975.

* cited by examiner

Primary Examiner—Edward K. Look
Assistant Examiner—John K. Fristoe, Jr.
(74) Attorney, Agent, or Firm—Luedeka, Neely & Graham, P.C.

(57) ABSTRACT

A hand-operated hemispherical or spherical valve that provides an improved seal when dealing with fluids containing, or consisting entirely of, particulate matter is provided by the present invention. The valve utilizes an inflatable elastomeric valve seat that interacts with a primary closing member to permit or restrain the flow of fluids or particulate matter in a channel. The valve is opened and closed by turning a handwheel that is connected to a drive shaft. A sleeve having a cam is mounted on the drive shaft such that the cam engages a pressurized gas supply switch that inflates the inflatable elastomeric valve seat or seats when the hand wheel is turned to a closed position. Conversely, when the hand wheel is turned to an open position, a valve drive shaft, key and keyway function in conjunction with the drive shaft to turn the sleeve and disengage the cam such that the elastomeric valve seats are deflated prior to the primary closing member moving out of the closed position.

23 Claims, 8 Drawing Sheets

INFLATABLE SEAT VALVE

FIELD OF THE INVENTION

The present invention relates generally to the field of valves. More particularly, the invention relates to a valve that automatically employs inflatable seals to reliably provide a pressure tight seal for a valve used to enable or restrict the flow of a fluid containing or consisting of particulate matter.

BACKGROUND OF THE INVENTION

Valves are used to control the flow of fluids in various situations where the fluid is being transferred from one location to another such as when oil or gas is transferred to a processing plant through a pipeline. In some situations, these fluids may contain solid particulate matter that is mixed in with a gas or liquid or consist entirely of a solid, granular material such as sand or sugar that behaves somewhat like a liquid when treated in bulk. Unfortunately, the presence of particulate matter in a fluid may affect the performance and operation of a valve that is being used to control the flow of the fluid. For example, particles may become trapped between the valve member and the valve seat thereby preventing the valve member from properly sealing against the valve seat. This may result in undesirable leaking of the valve when it is closed. In addition, particulate matter trapped between the valve member and the valve seat may cause damage to the valve member and valve seat when the valve is opened and closed.

One common method of achieving closure for a full-bore open requirement when dealing with fluids containing particulate matter is to use a ball valve that has a rotatably mounted spherical component with penetrations and two or more ports. In such a ball valve, the valve rotating assembly is typically turned through 90 degrees to align the inlet and outlet ports of the ball closing member with fixed or spring-loaded metallic or elastomeric seats in the body of the valve. The closing member of the ball valve remains in sliding contact with the seat during the closing action. To obtain a pressure tight seal, this type of ball valve typically relies on the elastic properties of the seat material and seating component in combination with mechanical loading provided by a spring force or the pressure of the fluid being controlled. This mechanical loading in combination with the elastomeric seat member functions to exclude or entrap particles that may render the closure of the valve inadequate against the influence of a pressure differential across the closing member. Unfortunately, this type of ball valve suffers from a number of drawbacks. For example, the elastomeric seat members are susceptible to wear from the entrapment and movement of particulate matter passing through the valve. In addition, the mechanical loading on the seal inhibits the easy movement of the valve thereby limiting its ability to be implemented in conjunction with hand-operated valves.

Therefore, what is needed is an improved valve for handling fluids containing or consisting of particulate matter.

SUMMARY OF THE INVENTION

A preferred embodiment of the present invention is designed to address the above discussed problems with the prior art by providing an improved valve for restricting the flow of a fluid through a channel. The valve includes a gas-inflatable elastomeric valve seat and a compressed gas system for generating a supply of pressurized gas. A gas control selectively applies a flow of pressurized gas from the compressed gas system to the gas-inflatable elastomeric valve seat and vents pressurized gas from the gas-inflatable elastomeric valve seat. A primary closing member restricts the flow of the fluid in the channel by engaging with the gas-inflatable elastomeric valve seat. In an especially preferred embodiment, the primary closing member is a partial spherical, ball or hemispherical valve member.

Preferably, a hand-operated control selectively controls the gas-inflatable elastomeric valve seat and the primary closing member to control the flow of fluid through the channel. The hand-operated control is configured to control the gas control such that pressurized gas is automatically applied to the gas-inflatable elastomeric valve seat when the hand-operated control is operated to restrict the flow of fluid through the channel by engaging the gas-inflatable elastomeric valve seat with the primary closing member. The hand-operated control is further configured to control the gas control such that pressurized gas is vented from the gas-inflatable elastomeric valve seat when the hand-operated control is operated to permit the flow of fluid through the channel by disengaging the gas-inflatable elastomeric valve seat from the primary closing member. Furthermore, instrumentation may be provided for measuring and monitoring the gas pressure in the gas-inflatable elastomeric valve seat if desired. In one embodiment, a handwheel is attached to a drive shaft to allow an operator to operate the valve by turning the handwheel. The handwheel is attached to the drive shaft through worm and wheel gearing such that mechanical forces placed on the primary closing member are not transmitted to the handwheel. If necessary, a locking mechanism such as a frictional clutch or a locking pawl may be provided for locking the closing member in a desired position.

A gas control switch controls the gas control such that pressurized gas is supplied to the gas-inflatable elastomeric valve seat when the gas control switch is engaged and gas is vented from the gas-inflatable elastomeric valve seat when the gas control switch is disengaged. A compensation system is utilized that includes a cam that is operably connected to the drive shaft such that the position of the cam rotates about an axis when the drive shaft is rotated. The cam is positioned to engage the gas control switch when the primary closing member is in a closed position and disengage the gas control switch when the primary closing member is not in the closed position. A valve drive shaft is utilized to move the primary closing member between an open position and a closed position. A key and a keyway are provided that cooperate with the drive shaft and the valve drive shaft to disengage the gas control switch prior to the valve drive shaft moving the primary closing member out of the closed position.

The above discussed embodiment of the present invention provides a number of benefits over prior art valves. For example, employing an inflatable valve seat in a hand-operated valve allows the primary closing member and valve seat to form a bubble-tight seal even in the presence of particulate matter. In addition, the provision of a partially spherical primary closing member allows the valve to close through a fully static or moving column of bulk materials containing particulate matter by rotating or displacing the column of bulk material in conjunction with the movement of the closing member. The deflation of the valve seat prior to the movement of the primary closing member improves the functioning of the valve by preventing damage to the valve seat caused by movement of the primary closing member when the valve seat is inflated. Furthermore, the automatic nature of the deflation and inflation of the valve seat minimizes the likelihood of an operator error. Therefore, the above discussed embodiment is a significant improvement upon the prior art.

An embodiment of the present invention is also directed toward a method of closing and sealing a hand-operated valve used to control the flow of fluids containing or consisting of particulate matter. In accordance with the method, a closure member is moved from an open position to a closed position such that the closure member is positioned adjacent an inflatable elastomeric valve seat when it is in the closed position. The inflatable elastomeric valve seat is automatically inflated with pressurized gas by mechanically engaging a pressurized gas supply switch with a cam once the closure member is in the closed position. In a preferred embodiment, the automatic inflation of the inflatable valve seat is delayed for a predetermined period of time after the closure member is moved into the closed position to ensure that the closure member is fully in the closed position. The inflatable elasotomeric valve seat is automatically deflated by disengaging the cam from the pressurized gas supply switch and venting the pressurized gas from the inflatable elastomeric valve seat prior to moving the closure member to the open position.

Automatically inflating and deflating an inflatable elastomeric valve seat in a hand-operated valve makes the valve easier to use. In addition, the automatic inflation and deflation minimizes the possibility an operator will mistakenly forget to inflate or deflate the valve seat prior to moving the closure member and thereby damage the valve. Furthermore, the use of a cam to engage and disengage a gas supply switch is a relatively inexpensive and cost effective means of controlling a valve when compared to other traditional methods of valve control. Therefore, the above discussed embodiment of the present invention represents a substantial improvement upon the prior art.

In yet another embodiment the present invention provides a hand-operated valve for controlling the movement of a fluid that includes particulate matter through a channel. The hand-operated valve includes a partial spherical valve member having a valve drive shaft such that rotation of the valve drive shaft moves the partial spherical valve member between a closed position and an open position. A gas-inflatable elastomeric valve seat acts in conjunction with the partial spherical valve member to restrict the flow of fluid through the channel when the partial spherical valve member is in the closed position and the gas-inflatable elastomeric valve seat is inflated with compressed gas. A compressed gas supply is utilized to provide the supply of compressed gas. A gas supply activation switch selectively supplies compressed gas from the compressed gas supply to the gas-inflatable elastomeric valve seat when the gas supply activation switch is engaged and vents compressed gas from the gas-inflatable elastomeric valve seat when the gas supply activation switch is disengaged. The valve is controlled with a hand-operated wheel that is operatively connected to a worm and wheel gear. The worm and wheel gear is operatively connected to a drive shaft. A sleeve is connected to the drive shaft. The sleeve has a cam on an outer surface and a keyway on an inner surface. The cam is positioned such that it engages the gas supply activation switch when the partial spherical valve member is rotated into the closed position. A key is mounted on the valve drive shaft. The keyway is designed to receive the key mounted on the valve drive shaft such that, when the partial spherical valve member is rotated out of the closed position, the sleeve rotates and the cam disengages the gas supply activation switch before the key mounted on the valve drive shaft engages the keyway on the sleeve and rotates the valve drive shaft.

While a number of embodiments have been described above, the embodiments are exemplary, not limiting, and it should be readily understood that the invention is susceptible to a variety of modifications and configurations. Therefore, having summarized various aspects of the invention in simplified form, the invention will now be described in greater detail with reference to the following figures wherein similar reference numerals designate similar features throughout the figures.

DETAILED DESCRIPTION OF THE INVENTION

Figure 1:
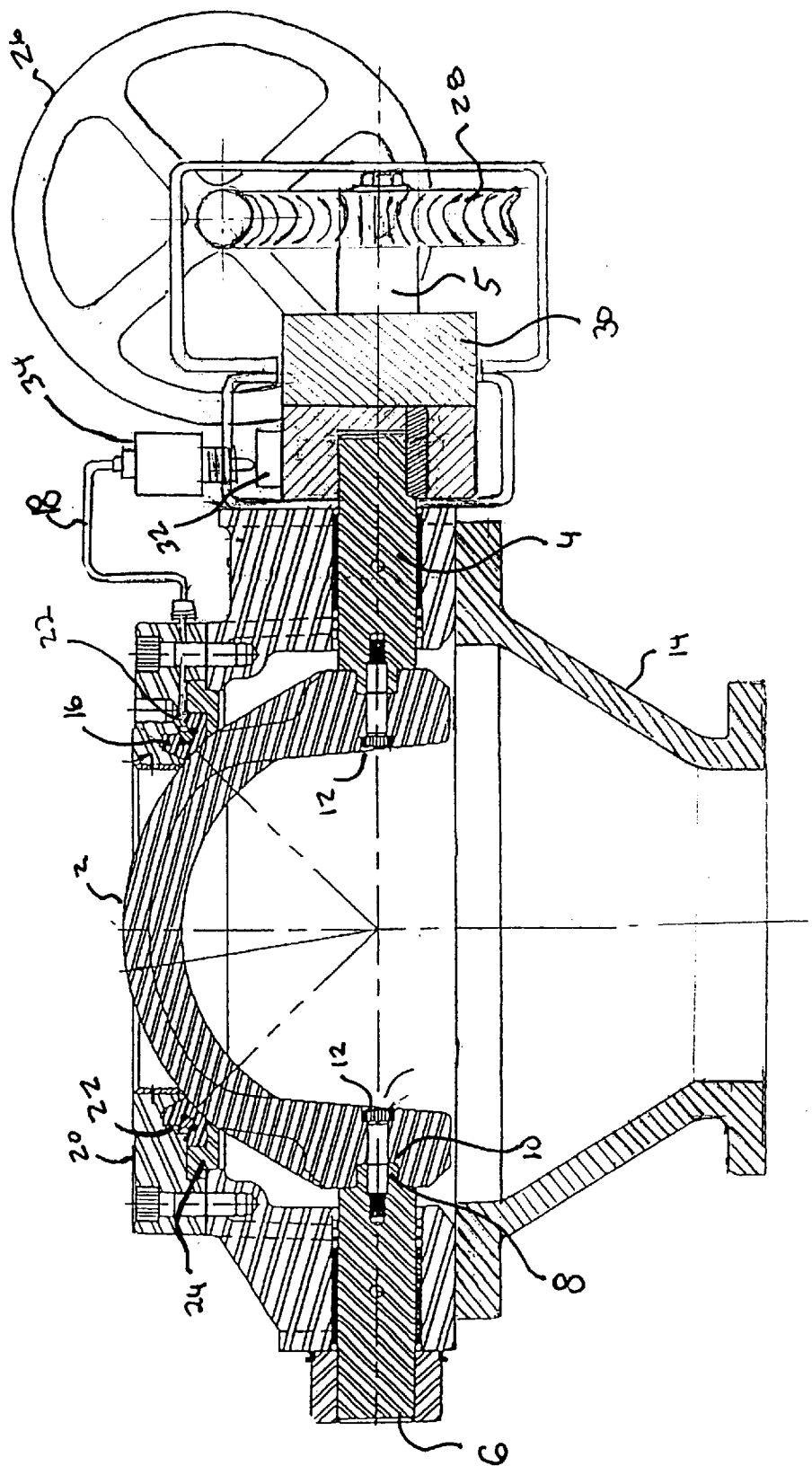
FIG. 1 is a cross-sectional view of a valve constructed in accordance with an embodiment of the present invention.

As briefly discussed above, preferred embodiments of the present invention are directed toward valves for controlling the flow of fluids including, for example, fluids containing, or consisting entirely of, particulate matter. These embodiments have a number of features that make them particularly suited to dealing with fluids containing particulate matter. To better explain these features, reference is made to FIG. 1 wherein a hand-operated valve constructed in accordance with a preferred embodiment of the present invention is shown in an expanded view. The hand-operated valve includes a hemispherical closure component 2 that is mounted on two shafts 4 and 6 through the use of interlocking male and female connections 8 and 10 and centerline fasteners 12. The male and female connections 8 and 10 and the center line fasteners 12 allow the hemispherical closure component 2 to rotate about the axis of the valve drive shafts 4 and 6. This rotation allows the hemispherical closure component 2 to be rotated 90 degrees from the closed position, in which it is shown in FIG. 1, to an open position whereby it is positioned away from the flow of fluids or other materials passing through the valve body 14. In the closed position, the hemispherical closure component 2 is positioned adjacent an elastomeric inflatable valve seat 16. The elastomeric inflatable valve seat 16 is inflated by a supply 18 of high-pressure gas that passes through a top plate 20 of the valve to a plenum 22 that is positioned behind the elastomeric inflatable valve seat 16. The elastomeric inflatable valve seat 16 is held in position by a clamping ring 24.

A handwheel 26 is used to operate the valve of the embodiment of the present invention shown in FIG. 1. The handwheel 26 rotates a drive shaft 5 through worm and wheel gearing 28 operatively connected to the handwheel 26. The worm and wheel gearing 28 prevents or reduces forces applied to the hemispherical closure component 2 from carrying through to the handwheel 26. Experience has shown that this type of worm and wheel gearing is especially useful when dealing with valves greater than 4 inches in diameter. In embodiments having smaller valves that are less than approximately four inches in diameter, it has been determined that a more simplistic actuating lever can be used in place of the worm and wheel gearing 28. The handwheel 26 rotates the drive shaft 5 through the worm and wheel gearing 28 shown in FIG. 1. A sleeve 30 is coupled to the drive shaft 5. The sleeve has a cam 32 that is positioned on the sleeve 30 to interact with a compressed gas control valve 34. When the hemispherical closure component 2 is in the closed position as shown in FIG. 1, the cam 32 engages the gas control valve 34 such that pressurized gas is supplied to the elastomeric inflatable valve seat 16. As the elastomeric inflatable valve seat 16 is inflated by the pressurized gas, it expands to come into contact with the hemispherical closure component 2 such that a seal is formed between the hemispherical closure component 2 and the elastomeric inflatable valve seat 16.

To achieve a reliable seal, the seal pressure in the elastomeric inflatable valve seat 16 is preferably at least 20 psi greater than the maximum contained pressure. Furthermore, a continuous supply of compressed air is preferably supplied to the elastomeric inflatable valve seat 16 to maintain the effectiveness of the seal by replacing any pressurized air that escapes from the elastomeric inflatable valve seat 16. However, it will be readily appreciated by those skilled in the art that the operating parameters of the valve will depend upon the particular application in which the valve is being used. In applications that require high reliability, the operating efficacy of the elastomeric inflatable valve seat 16 may be continually monitored by instrumentation that measures the gas pressure in the valve seat 16. The results of the measurements may be intelligently communicated to a user of the valve through a display or an alarm, or transmitted to a central computer or control center.

The elastomeric inflatable valve seat 16 shown in FIG. 1 improves the valve's ability to handle fluids having entrained solids or particulate matter by allowing the hemispherical closure component 2 to rotate to the closed or open position without coming into contact with the elastomeric inflatable valve seat 16. This prevents particulate matter in the fluid from degrading the sealing ability of the valve by rubbing against the valve components and wearing them down. In addition, the elimination of friction between the elastomeric inflatable valve seat 16 and the hemispherical closure component 2 when the hemispherical closure component 2 is being moved makes the valve of FIG. 1 easier to open and close.

The arrangement of FIG. 1 has a further advantage in that it provides a tighter seal than conventional valves used in conjunction with fluids containing particulate matter. In valves having rigid valve seats, particulate matter often becomes trapped between the valve seat and the valves primary closing member such that a tight seal is not formed between the valve seat and the primary closing member. However, in the embodiment of FIG. 1, the elastomeric nature of the inflatable valve seat 16 and the distributed effect of the compressed gas used to inflate the elastomeric inflatable valve seat 16 cause the inflatable seal to actively conform to the surface of the hemispherical closure component 2 and seal around any entrapped particles. In addition, the valve sealing action that results from the elastomeric inflatable valve seat 16 allows very high seat-to-closing member loads to be applied to the valve such that complete bubble-tight sealing may be achieved across the closing member 2. The flexible nature of the elastomeric inflatable valve seat 16 also continually compensates for any seal face erosion that takes place over the life of the valve. Thus, the embodiment of FIG. 1 provides a more reliable valve than rigid valve seat designs that has a dramatically increased operating life.

Figure 2:
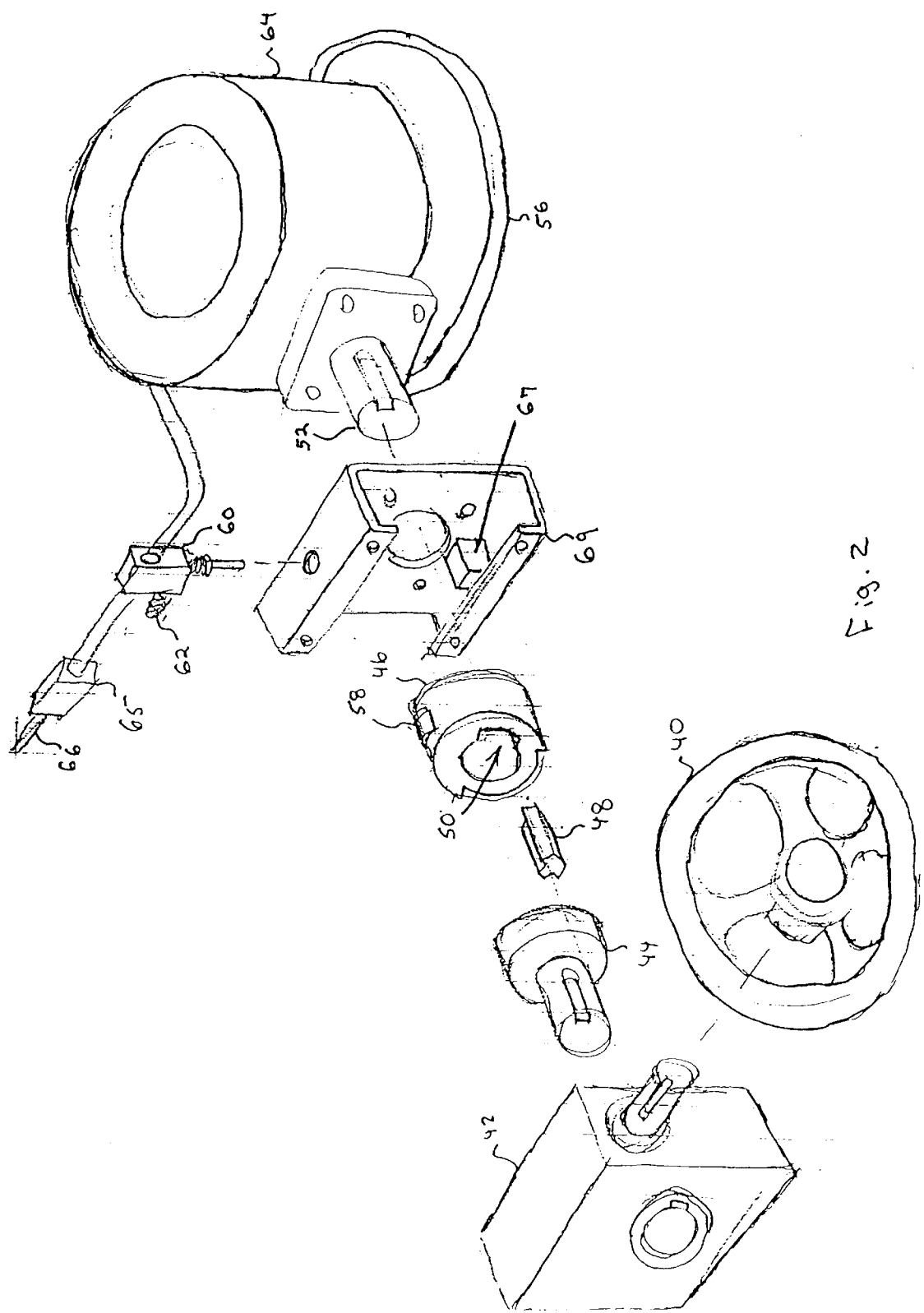
FIG. 2 is a three-dimensional expanded view of an opening and closing mechanism for a valve constructed in accordance with a preferred embodiment of the present invention.

Referring now to FIG. 2, an expanded view of an embodiment of the present invention is shown. The valve assembly shown in FIG. 2 is operated with a handwheel 40 or chain-wheel 40. A handwheel 40 type actuator is preferred because of its simplicity of operation and its low manufacturing cost. However, computer based controls and actuators also could be used in connection with the embodiment of FIG. 2 to control the operation of the valve. The handwheel 40 is connected to a gear box 42 that drives drive shaft 44, provides up or down gearing ratios if necessary and prevents forces acting upon the valve components from being transmitted back to the handwheel 40. While worm and wheel type gearing is preferred, in alternate embodiments a variety of different gearing systems could be used to perform the functions of the gear box 42. In addition, some embodiments will not utilize gearing at all.

A sleeve 46 is mounted on the drive shaft 44. The sleeve has keyway 50 that interacts with a key 48 that is mounted on a valve member drive shaft 52. Rotation of the valve member drive shaft 52 rotates the valve closure member (not shown in FIG. 2) between a closed position and an opened position inside a valve member housing 64. The keyway 50 is dimensioned such that the key 48 on the drive shaft 52 is smaller than the keyway 50. This difference in size allows the drive shaft 44 and the sleeve 46 to be rotated a relatively small amount without the key 48 engaging the keyway 50 and, thereby, rotating the valve member drive shaft 52. As discussed in more detail below, this interaction between the key 48 and the keyway 50 facilitates inflation and venting of the valve's inflatable valve seat 56.

A cam 58 is disposed on the sleeve 46 such that the cam 58 engages a compressed gas supply switch 60 when the handwheel 40 is actuated to place the valve closure member 2 in the closed position. A mechanical stop 67 is provided on a mounting bracket 69 such that the mechanical stop 67 prevents further rotation of the sleeve 46 when the valve closure member 2 is in the closed position. When the gas supply switch 60 is engaged by the cam 58, compressed gas from a compressed gas supply 66 is supplied to the inflatable valve seat 56. This compressed gas causes the inflatable valve seat 56 to expand and sealingly engage the valve closure member 2 which has been moved into the closed position. Preferably, a pneumatic delay 65 or flow restricting orifice 65 is provided to compensate for cam dwell and insure that the closing member is fully in the closed position prior to the inflatable valve seat 56 being inflated. If the pneumatic delay 65 is eliminated, the compressed gas may enter the inflatable valve seat 56 slightly before the valve closure component reaches the closed position. However, in such a case, the engagement of the inflatable valve seat 56 and the valve closure member 2 will still prevent movement of the valve closure member 2 and create a pressure tight closure. As discussed above, the inflatable valve seat 56 interacts with the valve closure member 2 to provide a tight seal. Furthermore, the elastomeric nature of the inflatable valve seat 56 allows the tight seal to be formed around any particulate matter that may be trapped between the valve closure member 2 and the inflatable valve seat 56.

To open the valve assembly of FIG. 2, the handwheel 40 is rotated to move the closing member 2 to an open position. However, it is important to vent the inflatable valve seat 56 prior to moving the closing member 2 because particulate matter entrapped between the inflatable valve seat 56 and the closing member may prevent movement of the closing member or cause damage to the closing member or the inflatable valve seat 56. Thus, when the handwheel 40 is turned away from the closed position to the open position, the keyway 50 allows the sleeve 46 to rotate and disengage the cam 58 from the compressed gas supply switch 60 before the key 48 engages the valve drive shaft 52 and moves the valve's closing member. When the compressed gas supply switch 60 is disengaged, compressed gas is vented from the inflatable valve seat 56 (inflatable valve seat 16 in FIG. 1) through a vent 62. Thus, by the time the key 48 engages the side of the keyway 50 to move the valve closure member 2, the compressed gas has been vented from the inflatable valve seat 56 to such an extent that the inflatable valve seat 56 and the valve closure member 2 are not in firm contact. This automatic inflation and deflation of the inflatable valve seat is especially beneficial in that it does not require any specific actions to be taken on the part of the valve operator.

The present invention is also directed toward a method of closing and sealing a hand-operated valve used to control the flow of fluids containing or consisting of particulate matter. An embodiment of such a method is illustrated in the flow chart of FIG. 3. The method commences in block 70 with the moving of a closure member from an open position to a closed position such that the closure member is positioned adjacent an inflatable elastomeric valve seat in the closed position. The closure member may be a ball valve member, a partial spherical valve member or a hemispherical-shaped valve member or any of a variety of other valve closure members known to those skilled in the art. Once the valve member has been moved into a closed position, the method proceeds to block 72 wherein a predetermined amount of time is waited. After the predetermined period of time has expired, preferably about half a second, the method proceeds to block 74 wherein an inflatable elastomeric valve seat is inflated with pressurized gas by mechanically engaging a pressurized gas supply switch. As previously discussed above, the inflatable valve seat provides a bubble-tight seal with the closure member that is particularly useful when dealing with fluids that contain or consist of particulate matter. Furthermore, waiting a predetermined amount of time after the closure member is moved into the closed position before inflating the inflatable elastomeric valve seat insures that the closure member is fully in the closed position before the valve seat inflates. The amount of time for the delay or wait varies and is dependent on the size of the valve and the intended application in which the valve is used.

Figure 3:
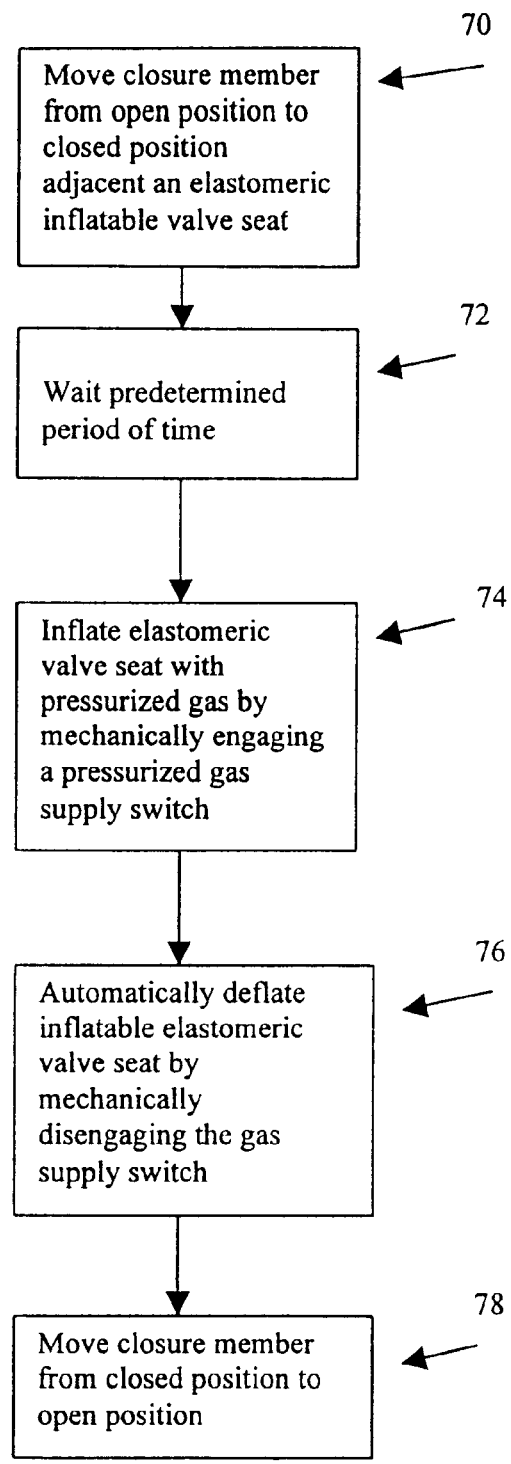
FIG. 3 is a flow chart of a method of closing and sealing a valve used to control the flow of fluids containing particulate matter in accordance with an embodiment of the present invention.

The method of FIG. 3 next proceeds to block 76 wherein the inflatable elatsomeric valve seat is automatically deflated by mechanically disengaging the pressurized gas supply switch prior to moving the closure member. Deflation is preferably initiated by sensing an attempt to open the closure member, which is preferably sensed by detecting movement of, or pressure on, the drive train of the closure member in the opening direction. The method ends with the moving of the closure member to the open position as set forth in block 78. Deflating the inflatable elastomeric valve seat prior to moving the closure member to the open position prevents the inflatable elastomeric valve seat from being damaged by particulate matter that is trapped between the valve seat and the closure member. Furthermore, automatically deflating the elasotomeric valve seat eliminates the possibility that an operator will forget to deflate the valve seat prior to moving the closure member and thereby damage the inflatable elastomeric valve seat. Therefore, the method of opening and closing a valve in accordance with this embodiment of the present invention substantially improves upon the prior art methods of opening and closing valves.

Figure 4:
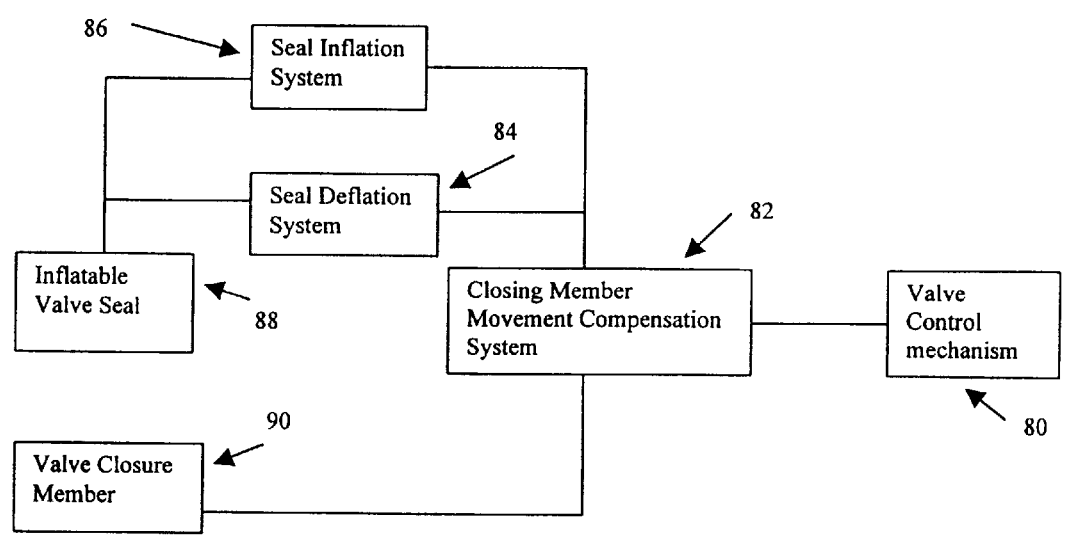
FIG. 4 is a block diagram of an apparatus in accordance with an embodiment of the present invention.
Figure 5A:
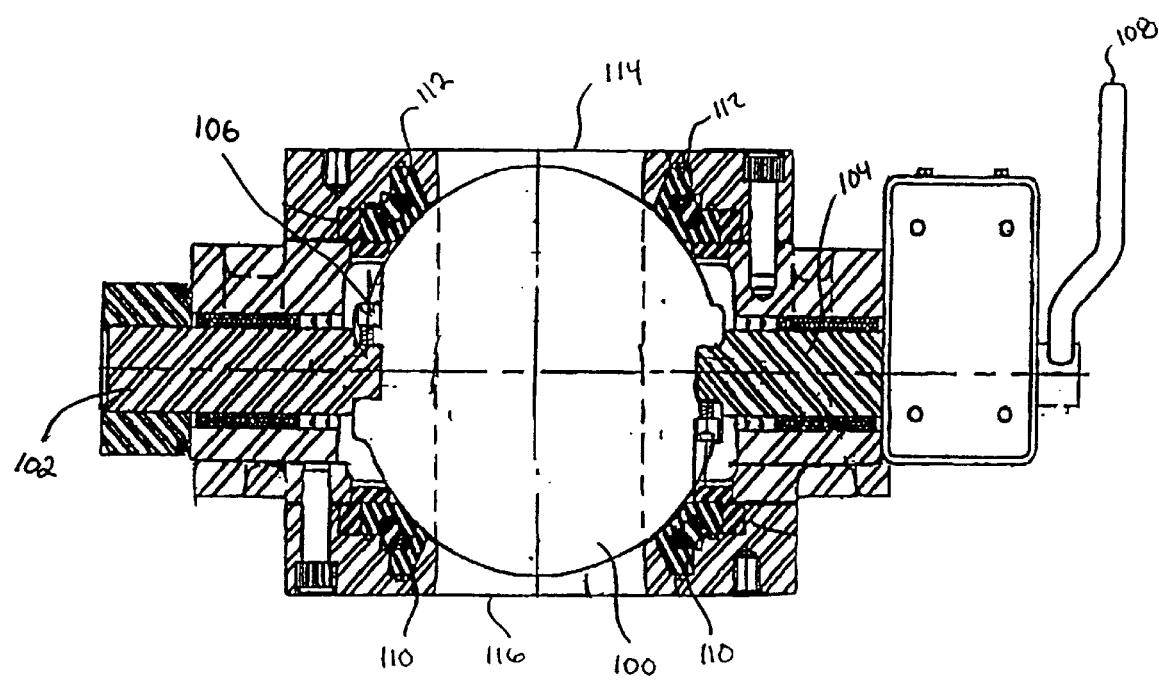
FIGS. 5(a) and 5(b) are cross sectional views of an embodiment of the present invention that utilizes two inflatable seals.
Figure 5B:
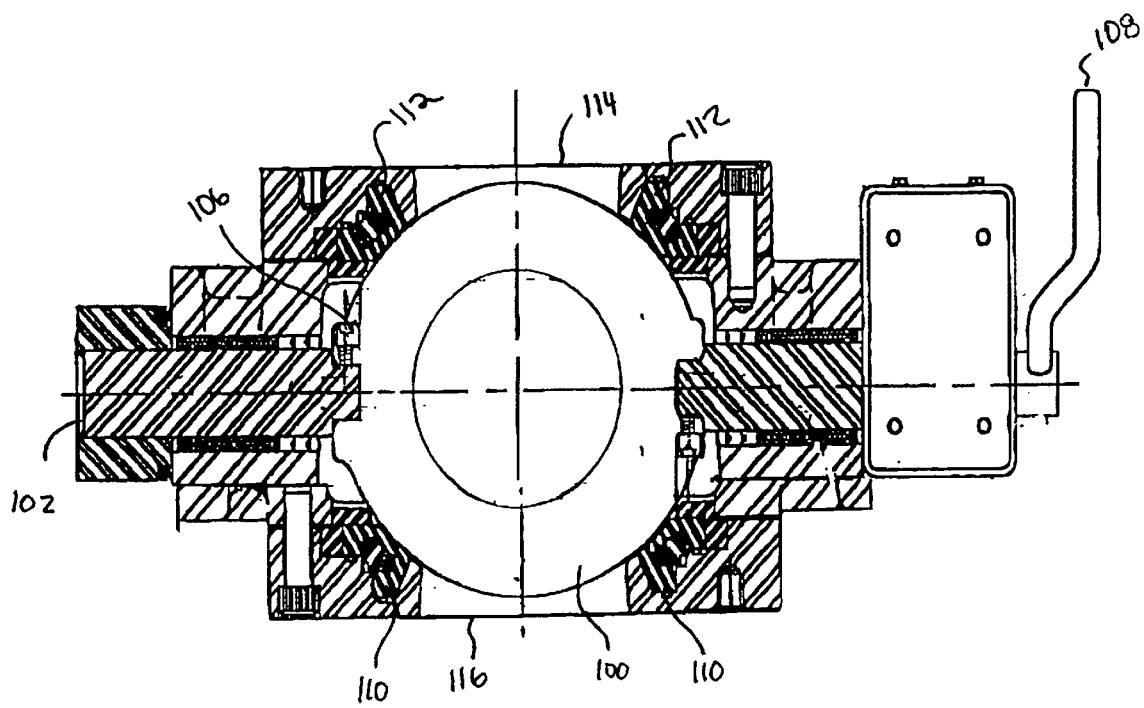

Referring now to FIG. 4, a block diagram of a valve constructed in accordance with an embodiment of the present invention is shown. The valve includes a valve closure member 90 that interacts with an inflatable valve seal 88. When the valve closure member 90 is in a closed position and the inflatable valve seat 88 is inflated, the flow of fluid through the valve is prevented. When the valve closure member 90 is in the open position and the inflatable valve seal 88 is deflated, fluid is permitted to flow through the valve. The valve has a valve control mechanism 80 that is utilized to control the movement of the valve closure member 90 between the closed position and an open position. The valve control mechanism 80 operates the valve closure member 90 through a closing member movement compensation system 82. The closing member movement compensation system 82 further controls inflation and deflation of the inflatable valve seal 88 through a seal inflation system 86 and a seal deflation system 84.

To better understand the functioning of the valve of FIG. 4, consider the case where the valve control mechanism 80 is operated to move the valve closure member 90 from an open position to a closed position. When the valve closure member 90 is in the closed position, the inflatable valve seal 88 is deflated. When the valve control mechanism 80 is operated to close the valve, the closing member movement compensation system 82 moves the valve closure member 90 to the closed position and then activates the seal inflation system 86 to inflate the inflatable valve seal 88. Once it has been inflated, the inflatable valve seal 88 acts in conjunction with valve closure member 90 to produce a tight seal that prevents fluid from flowing through the valve. The flexible nature of the inflatable valve seal 88 insures that a tight seal is formed with the valve closure member 90 even if the fluid in the valve contains entrained particulate matter. When the valve control mechanism is operated to move the valve closure member from the closed position to the opened position, the closing member movement compensation system 82 activates the seal deflation system 84 to deflate the inflatable valve seal 88. However, the closing member movemenmt compensation system 82 delays moving the valve closure member 90 until such time as the inflatable valve seal 88 is deflated. This delay insures that the inflatable valve seal 88 is not damaged by moving the valve closure member 90 while particulate matter is trapped between the inflated inflatable valve seal 88 and the valve closure member 90. Thus, the embodiment of FIG. 4 provides a valve that is simpler to use and better adapted handle fluids consisting of, or containing, particulate matter.

As shown in FIGS. 5(*a*) and 5(*b*), the present invention is also directed towards a valve having a ball-shaped or spherical valve member. The valve has a ball closure component 100 that is mounted to two shafts 102 and 104 by interlocking male and female connections and a lateral locking fastener 106. The shaft is driven from one side by a handwheel, chain wheel or lever 108. The ball closure component 100 rotates 90 degrees from an open position, as shown in FIG. 5(*a*), to a closed position, as shown in FIG.

5(b), to control the flow of fluid through the valve. The ball closure component 100 has inflatable seals 110 and 112 at both the inlet 114 and outlet 116 ports of the valve that are inflated from a supply of high-pressure gas 118. The inflation and deflation of the inflatable seals 110 and 112 is controlled such that the ball closure component 100 rotates to the closed or open position without coming into contact with the inflatable seals 110 and 112. A close up of the construction of the inflatable seals 110 and 112 and the high-pressure gas supply 118 is shown in FIGS. 6(a) and 6(b) as discussed in more detail below.

The inflatable seals 110 and 112 are preferably inflated when the valve is in both the closed position and the open position to allow the seals 110 and 112 to come into pressurized contact with the ball closure component's 100 surface. This ensures that fluid only passes through the ball closure component 100 and not around the outside of the ball closure component 100. This prevents erosion to the drive shafts 102 and 104 due to fluids flowing around the ball closure component 100 during prolonged periods when the valve is open. In addition, the operating efficacy of the inflatable valve seals 110 and 112 may be continually monitored by instrumentation that measures the gas pressure in the seals 110 and 112. The results of the measurements may be intelligently communicated by providing appropriate alarms in valve applications that have high reliability requirements.

Figure 6A:
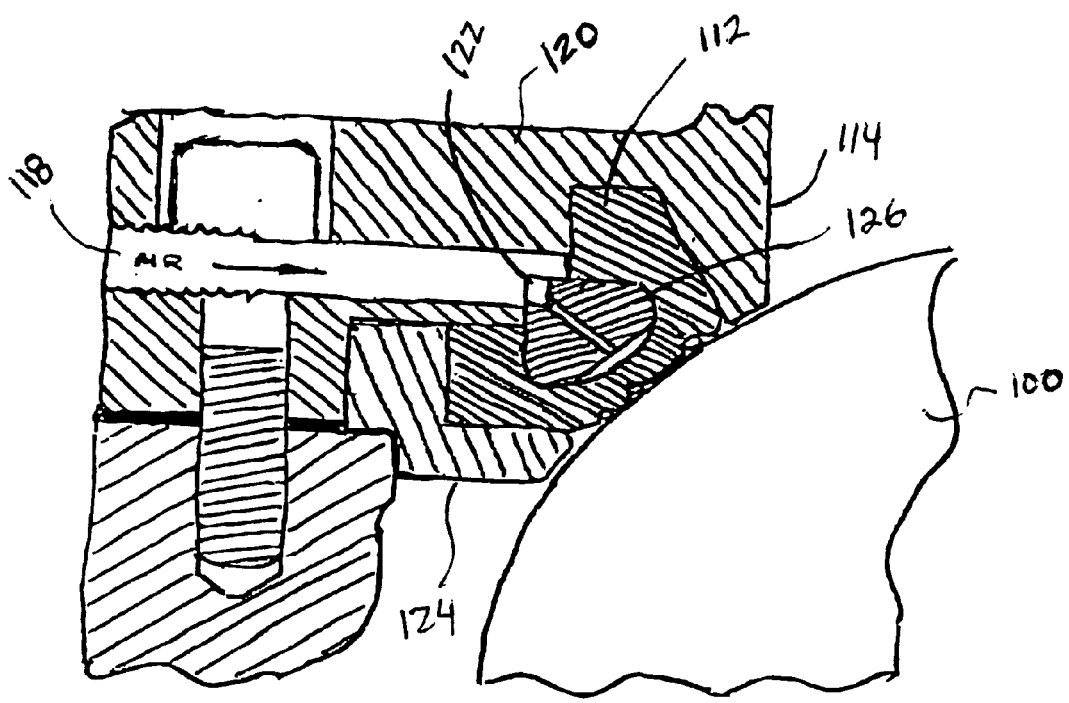
FIGS. 6(a) and 6(b) are close up cross sectional views of the inflatable seals and high-pressure gas supply shown in FIGS. 5(a) and 5(b)
Figure 6B:
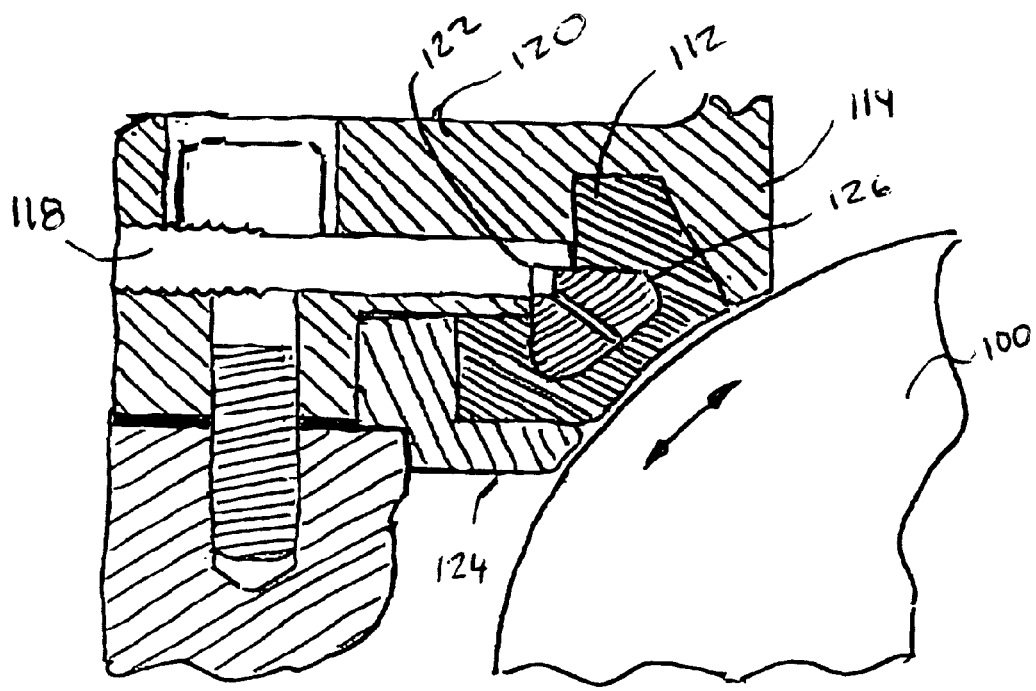

Referring now to FIGS. 6(a) and 6(b), a close up of the construction of the inflatable seals 110 and 112 is shown. In FIG. 6(a), the inflatable seal 112 is shown in the inflated position. The inflatable seals 110 and 112 at both the inlet port 114 and the outlet port 116 are inflated by a supply of high-pressure gas 118 through an end plate 120 to a plenum 122 behind the inflatable seal 112. The inflatable seal 112 is held in position by a clamping ring 124 and restrained for controlled movement by profile ring 126. As shown in FIG. 6(b), when the inflatable seal 112 is deflated, the ball closure component 100 is not in contact with the inflatable seal 112 and can be freely rotated without rubbing against the seal 112.

Figure 7:
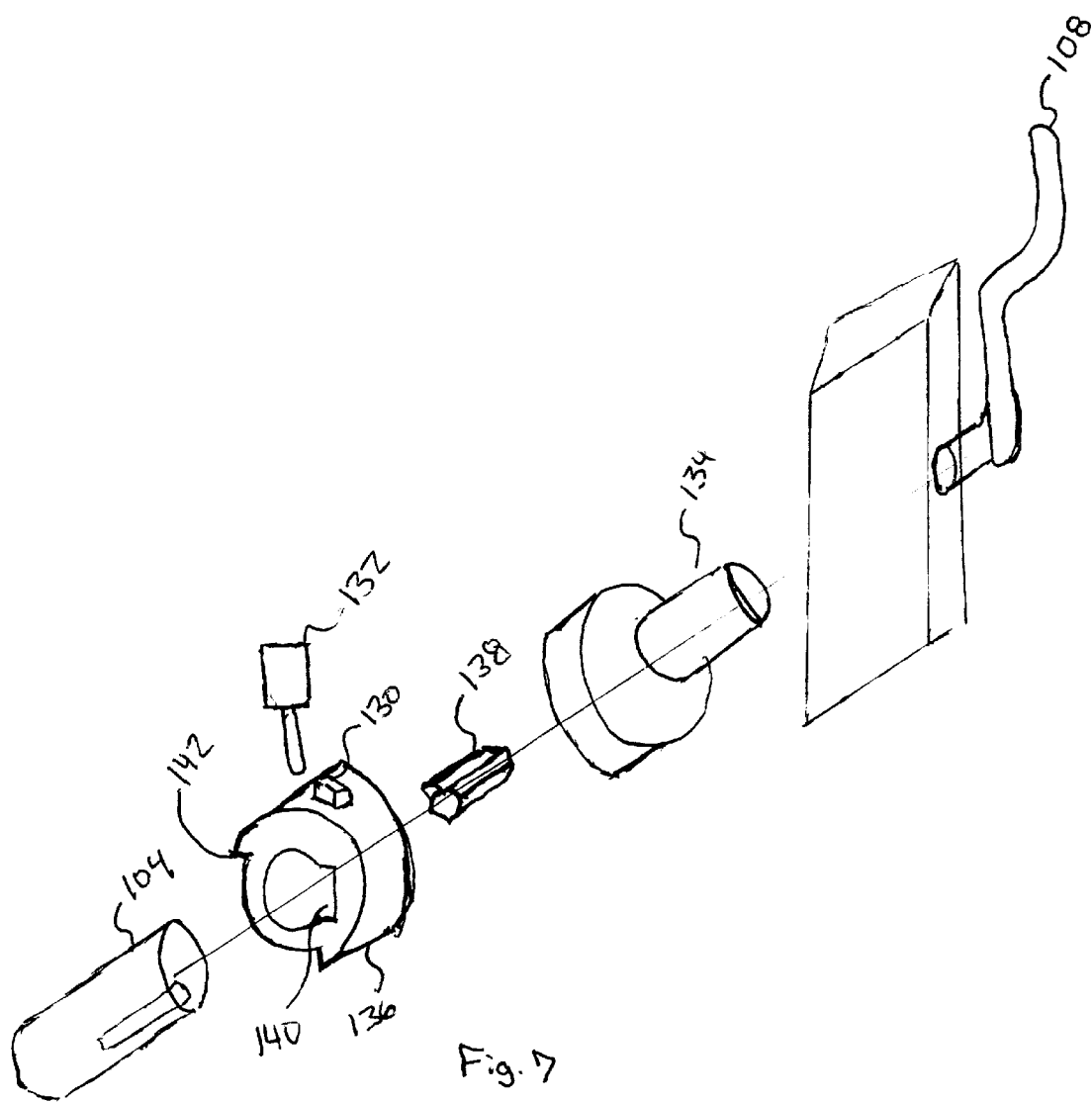
FIG. 7 is an expanded view of a cam arrangement for a preferred embodiment of the present invention.
Figure 1:
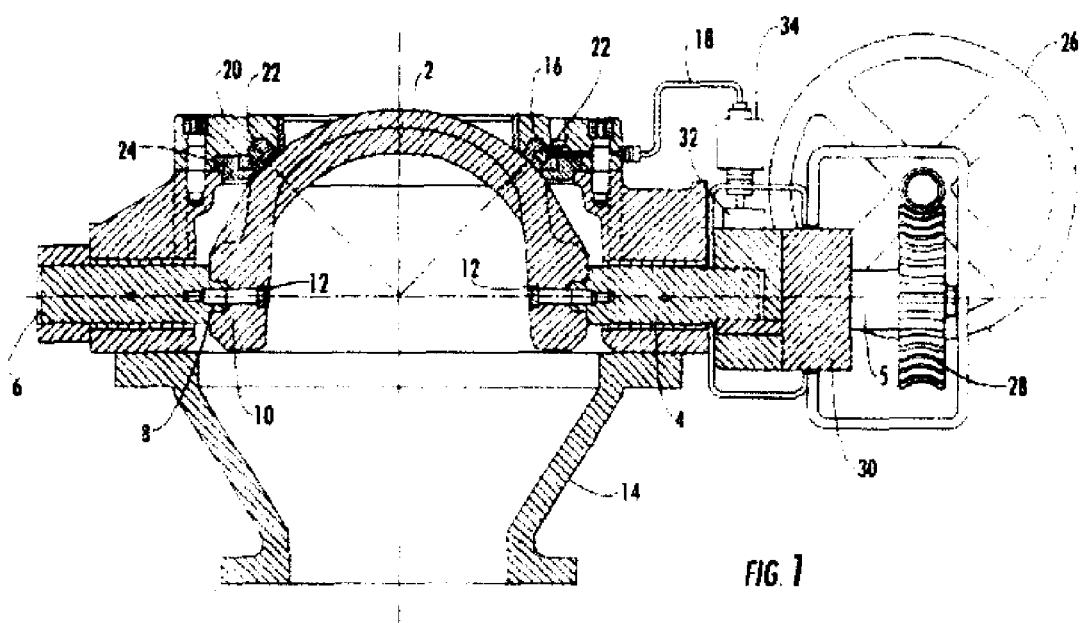
Figure 3:
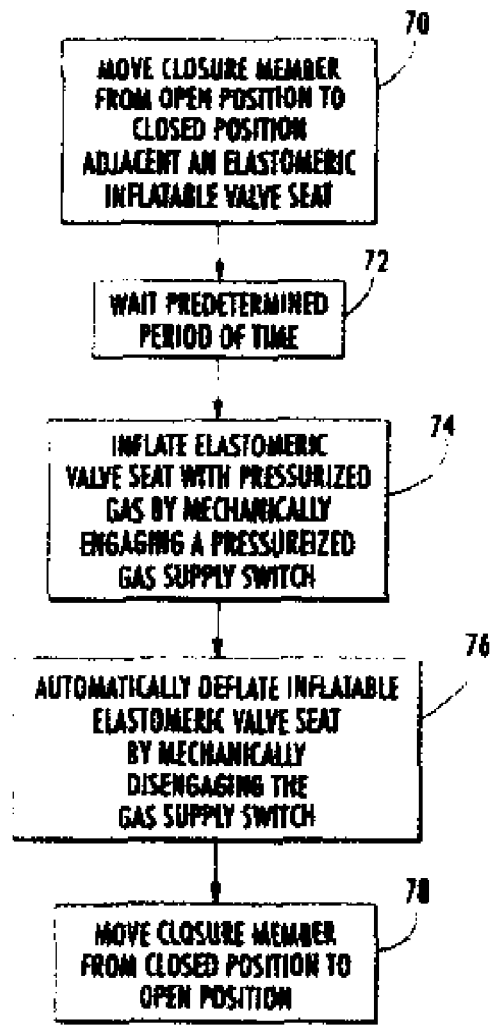
Figure 4:
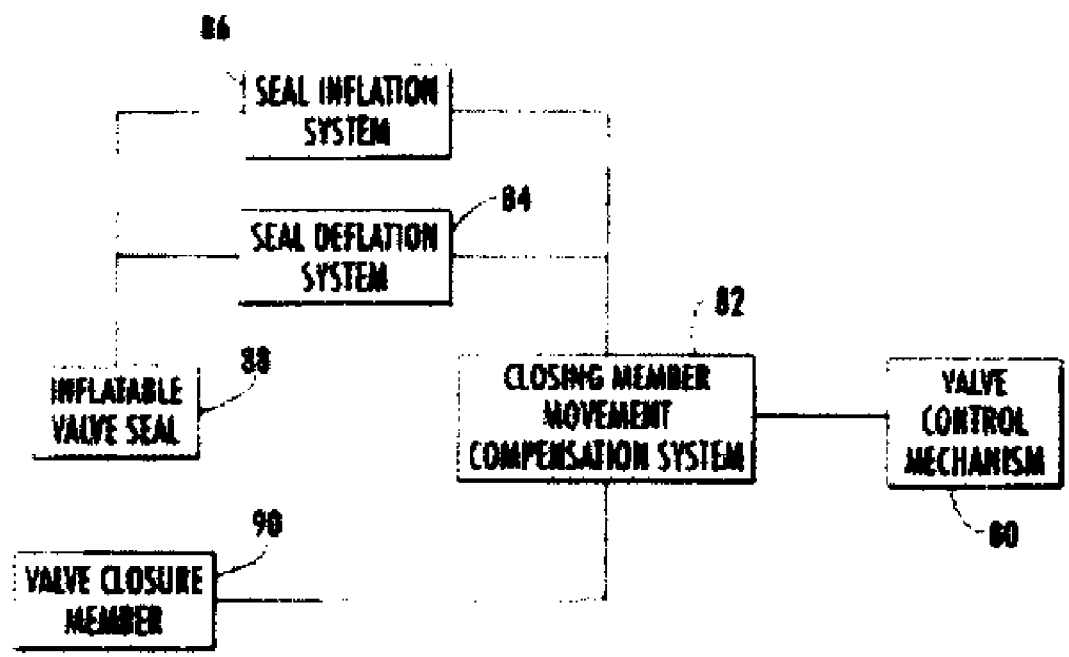
Figure 5A:
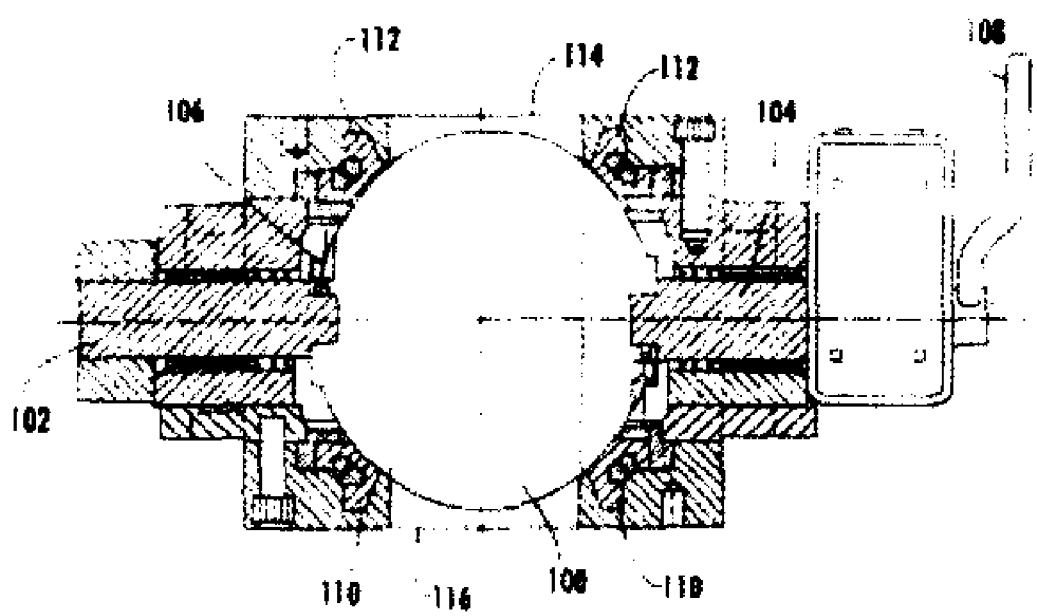
Figure 5B:
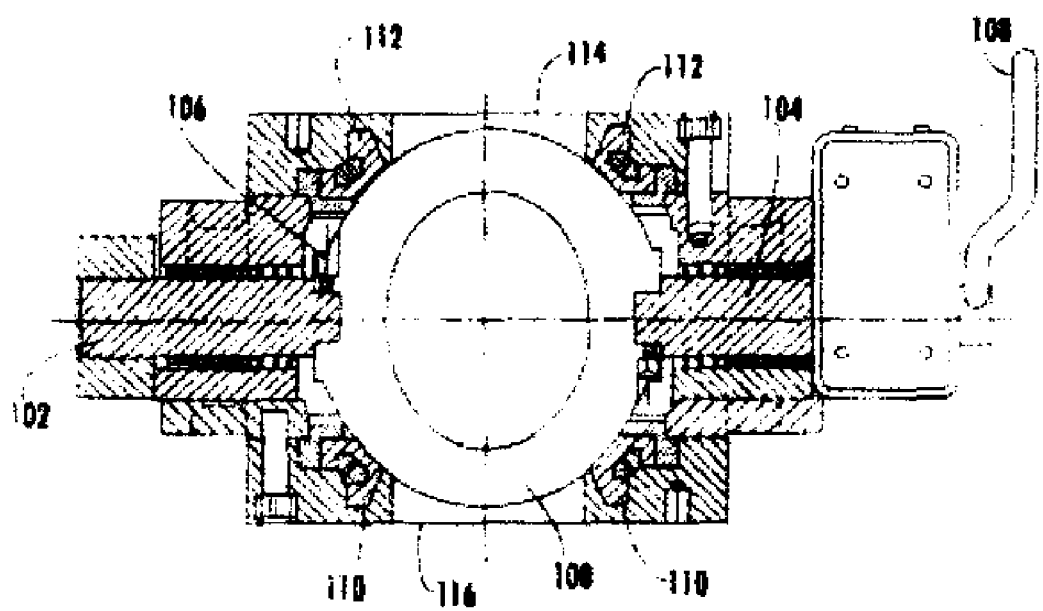
Figure 6A:
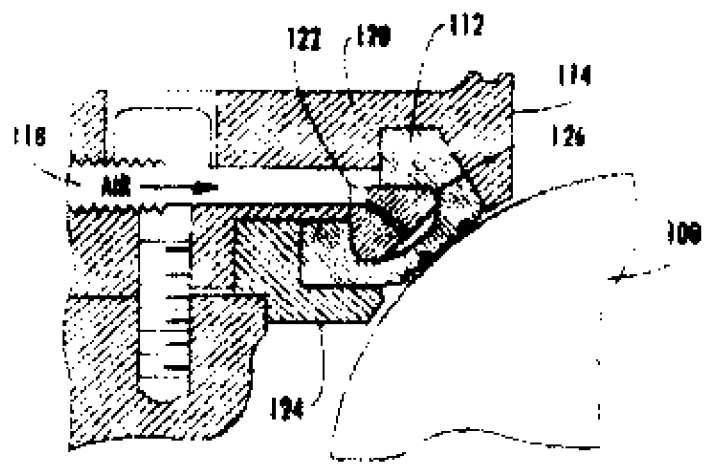
Figure 6B:
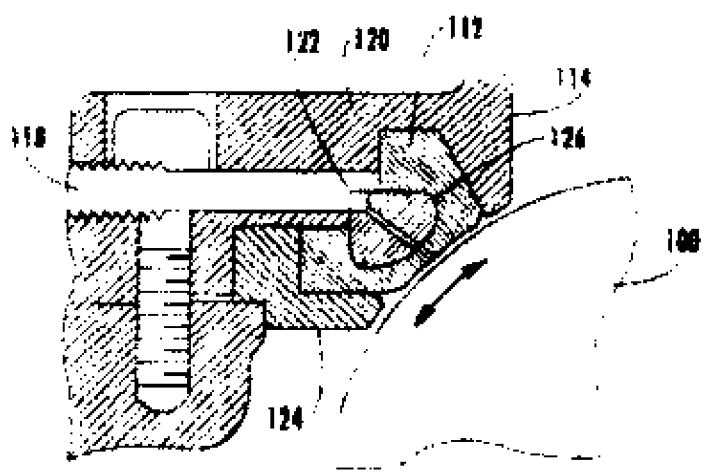
Figure 7:
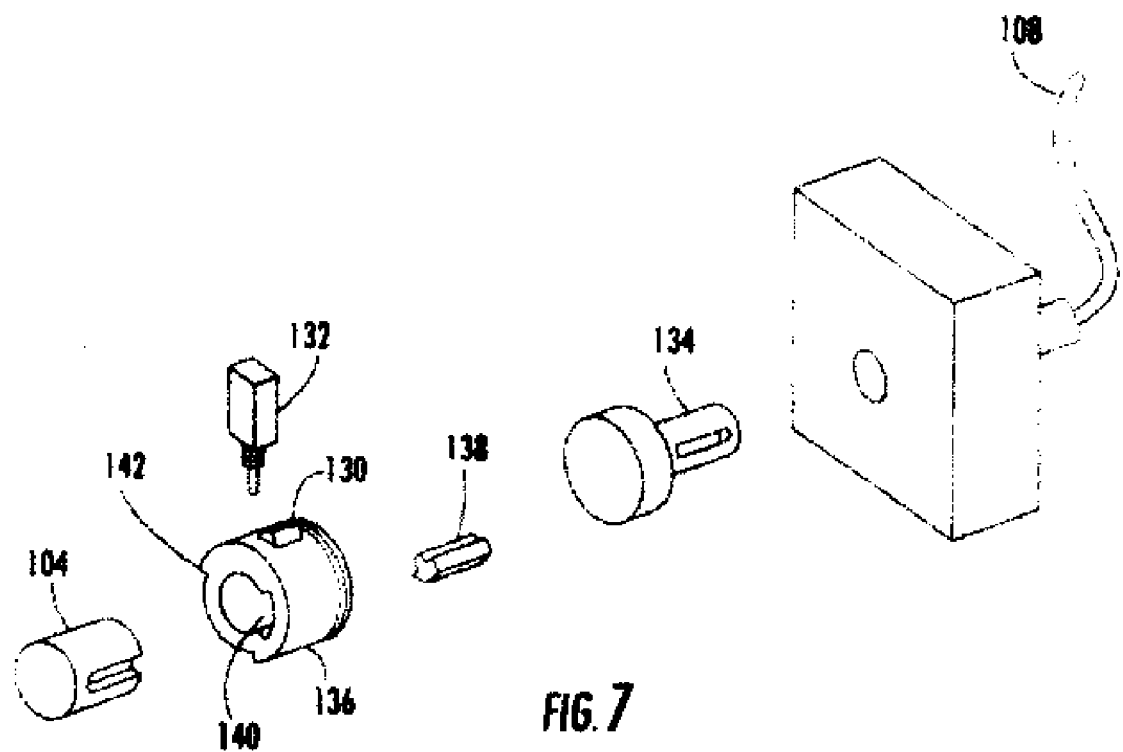
Figure 1:
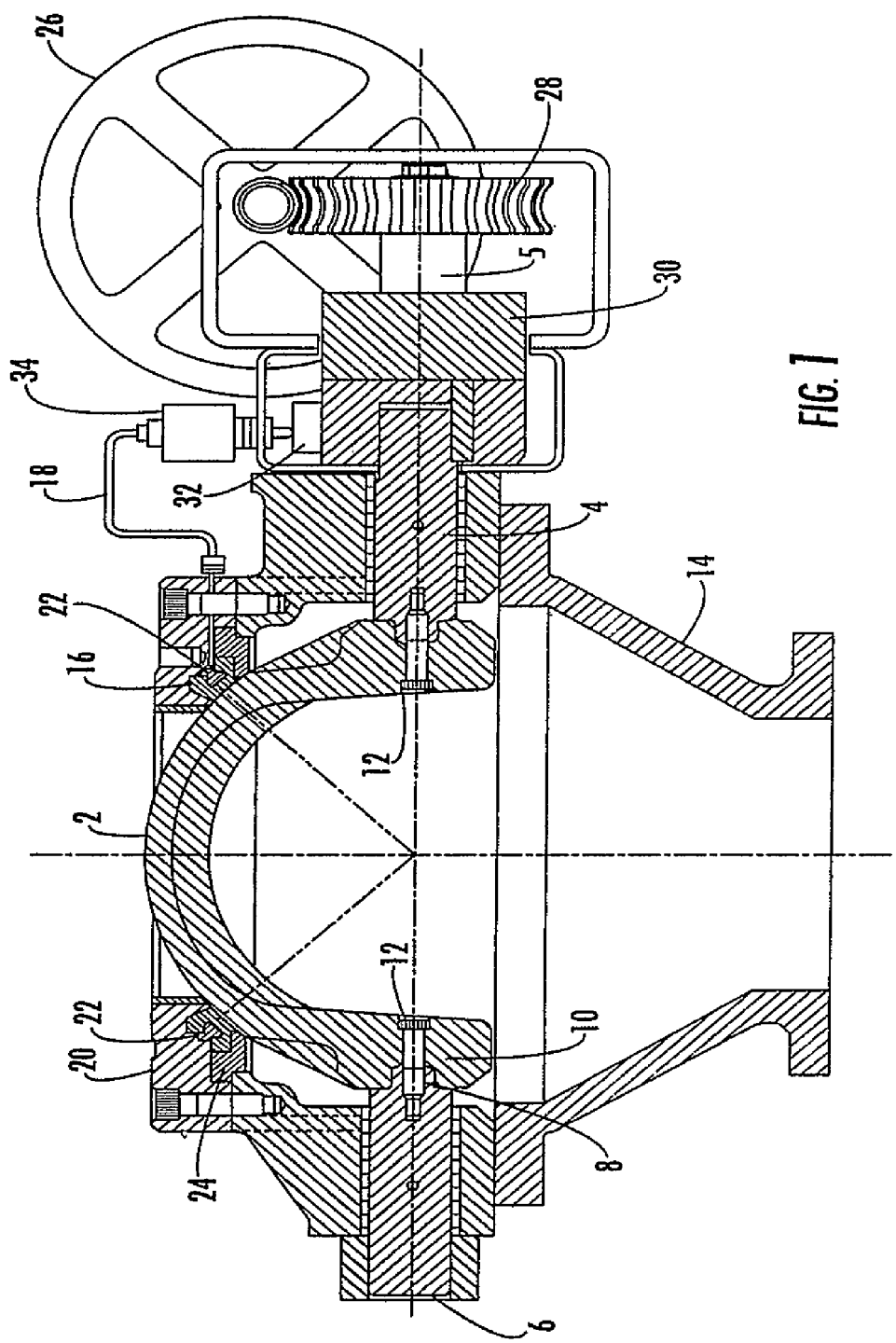
Figure 2:
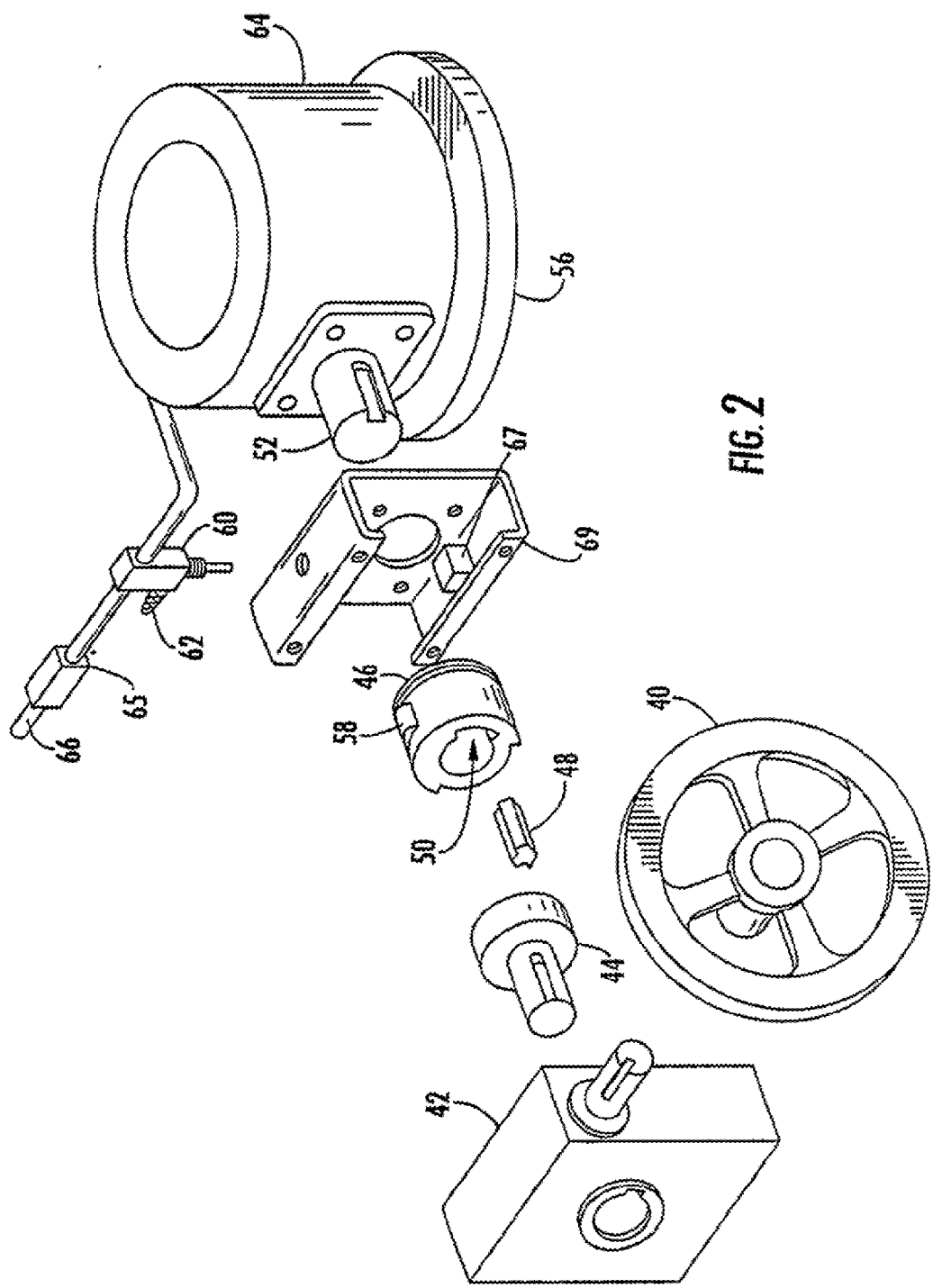
Figure 3:
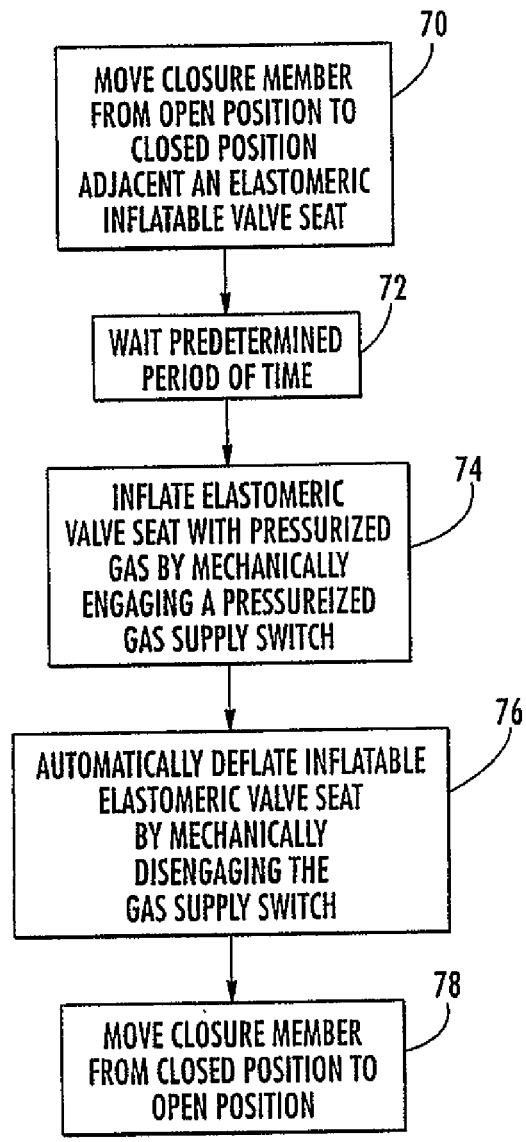
Figure 4:
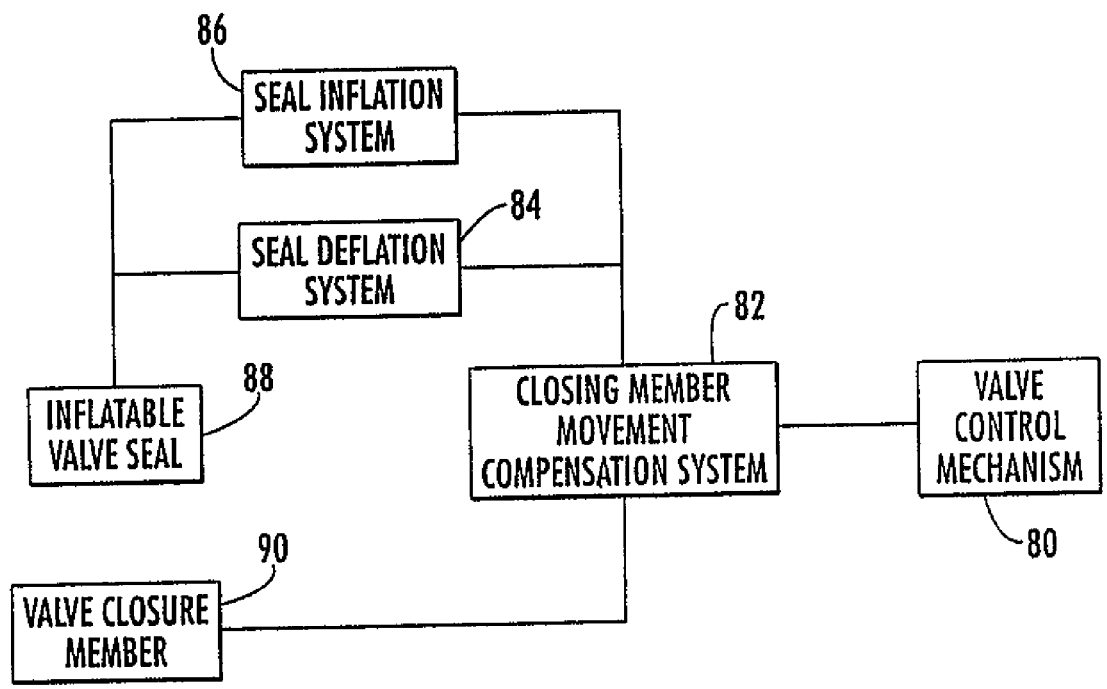
Figure 5A:
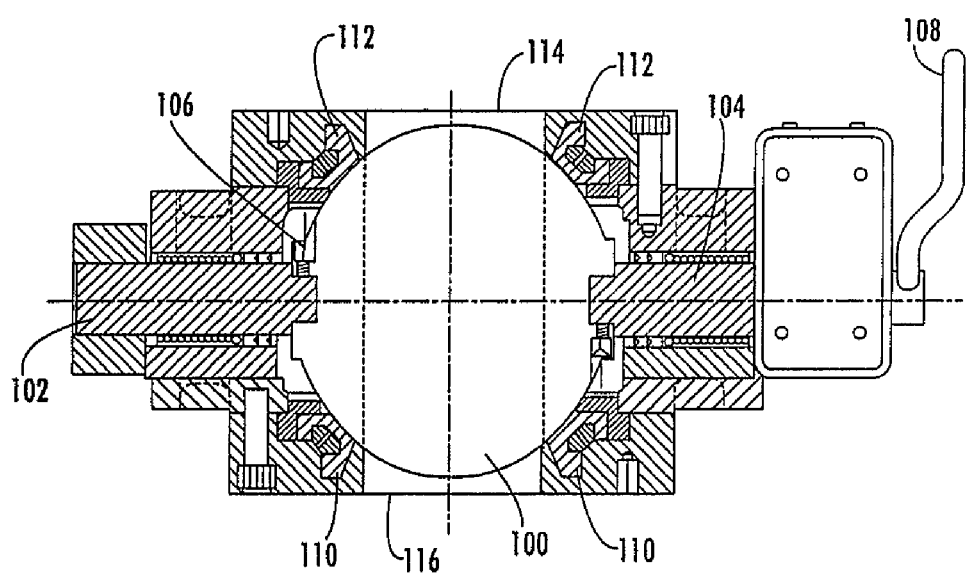
Figure 5B:
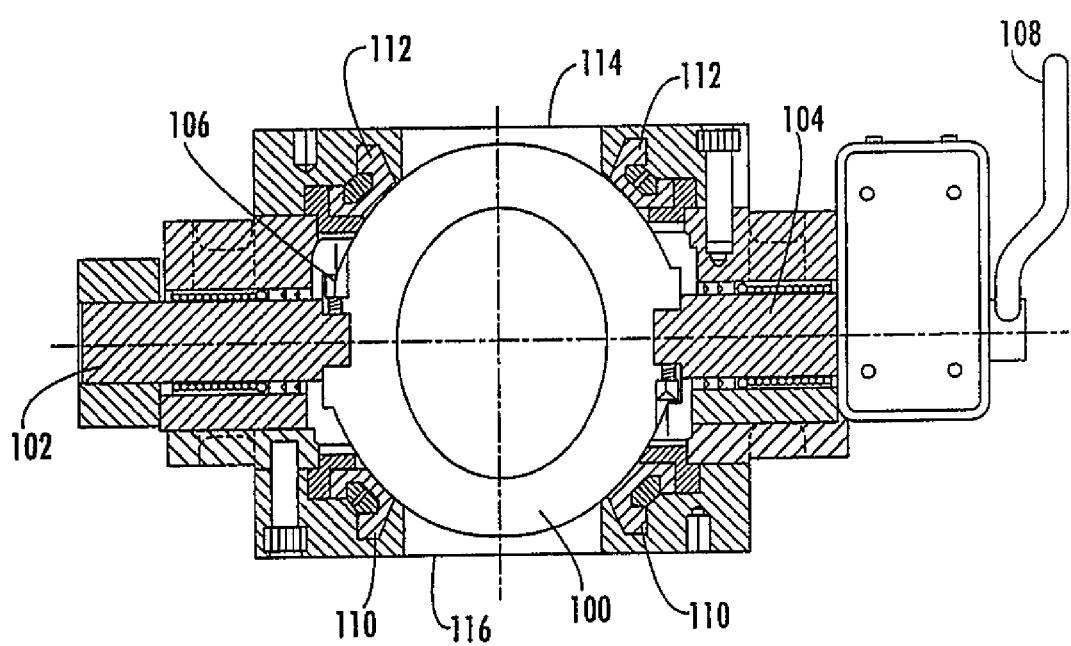
Figure 6A:
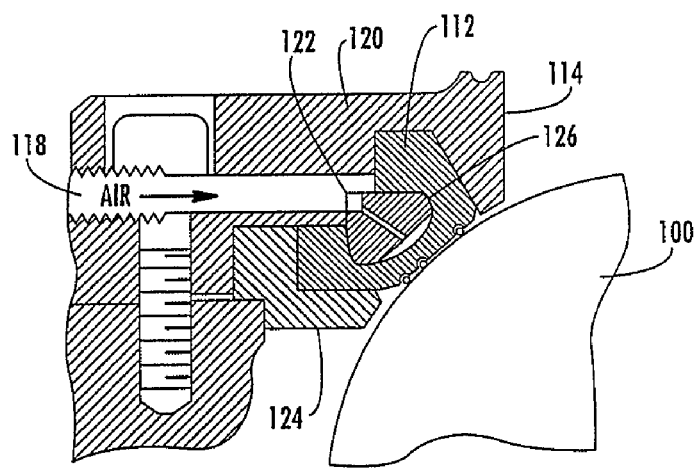
Figure 6B:
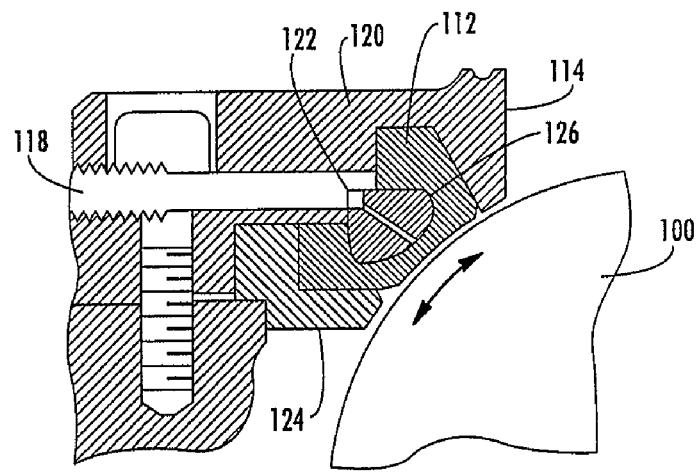
Figure 7:
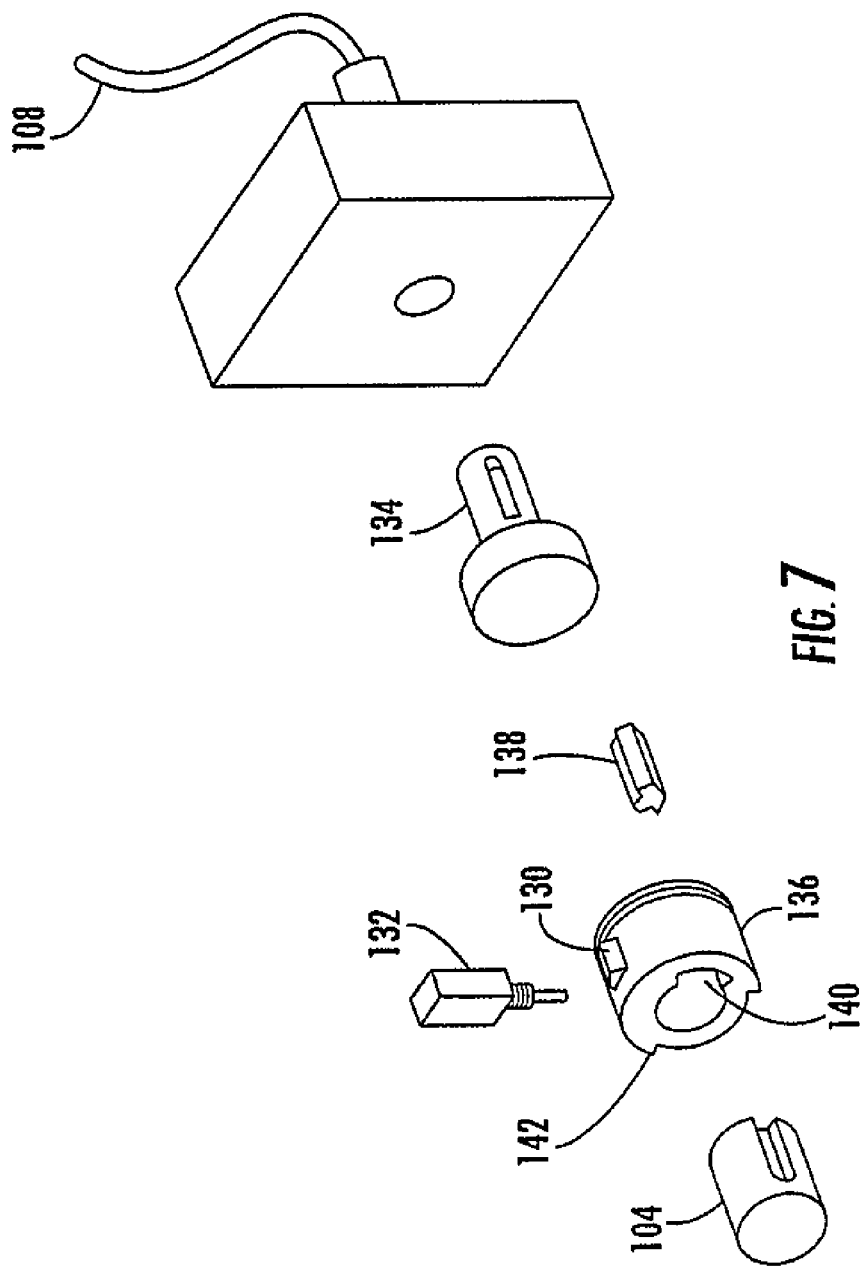

The embodiments of FIGS. 5 and 6 preferably utilize a cam arrangement as shown in FIG. 7 to insure that the inflatable seals 110 and 112 are deflated prior to movement of the ball closure component 100. In such an embodiment, the activation of the inflatable seals 110 and 112 is achieved by engagement of a cam 130 with a plunger operated compressed gas control valve 132. The cam 130 is driven by rotation of a shaft 134 that is in turn rotated by a hand lever 108. The cam 130 is mounted to a sleeve 136 that is fitted to the drive shaft 134. The shaft 134 rotates the sleeve 136 which in turn rotates the valve drive shaft 104 through a longitudinal key 138. Preferably, the longitudinal key 138 has sloped driving faces that minimize wear and deformation of the longitudinal key 138 and the corresponding keyway 140. The keyway 140 in the sleeve 136 is of a greater angular dimension than the mating section of the longitudinal key 138 to allow a few degrees of free rotational movement between the shaft 104 and the key 138 and the cam carrying sleeve 136. Upon opening of the valve, this freedom of movement allows the sleeve 136 to rotate enough to disengage the cam 130 from the plunger of the plunger operated compressed gas control valve 132 before the valve drive shaft 104 rotates the valve closure member 100. When the cam 130 is disengaged from the plunger of the plunger operated compressed gas control valve 132, the inflatable seal is disconnected from its air supply and air pressure is vented from the plenum. When the sleeve 136 has been rotated by the shaft 134 through the free range of movement, the side of the keyway 140 then comes into contact with the key 138 which begins to rotate the valve drive shaft 104 thereby rotating the ball closure component 100 of the valve into the open position. An additional cam may be provided on the sleeve 136 such that the seals are inflated at both the open and closed positions. In addition, a positive mechanical stop may be also provided that interacts with mechanical lugs on the sleeve 136 such that a operator cannot force the valve past its fully open or closed position.

For a valve closing action, the above process is reversed. The closing movement of the lever 108 and the drive shaft 134 first takes up the rotational free movement between the sleeve 136 and the key 138. Then the valve drive shaft 104, driven by the key 138, starts to rotate toward the closed position. Continued rotation causes the cam 130 to re-engage the air valve plunger 132 just before the ball valve closure member 100 reaches the fully closed position. As previously discussed, a pneumatic delay or flow restricting orifice in the air supply line may be provided to prevent the seal 112 from inflating until the ball closure member 100 has rotated a slight additional degree to compensate for the cam dwell. Alternatively, the pneumatic delay or flow restricting orifice may be omitted in which case the compressed gas will enter the inflatable seal 112 slightly before the ball component 100 reaches the fully closed position. In either case, the engagement of the inflatable seal 112 with the ball closure component 100 will prevent movement of the ball closure member 100 and achieve a pressure-tight closure.

In view of the above explanation of the particular features of the present invention, it will be readily appreciated by one skilled in the art that the present invention can be usefully employed in a wide variety of embodiments. While certain embodiments have been disclosed and discussed above, the embodiments are intended to be exemplary only and not limiting of the present invention. The appropriate scope of the invention is defined by the claims set forth below.

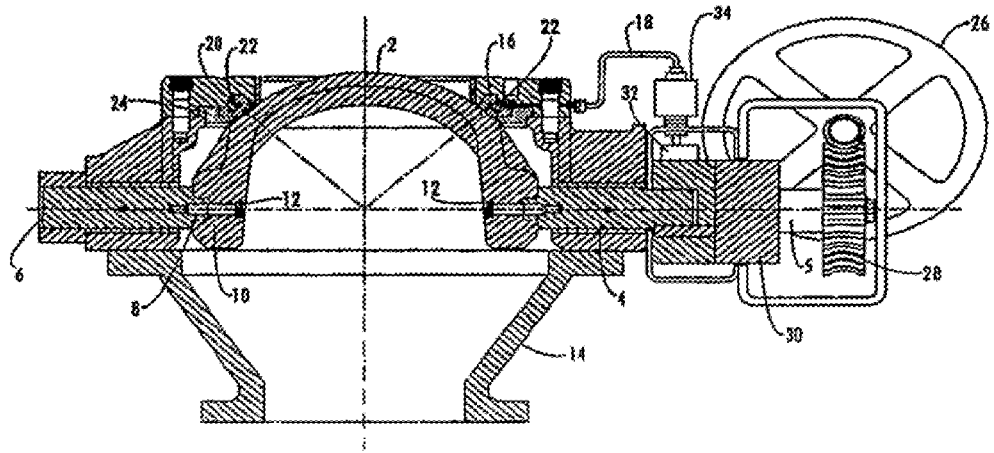

I claim:

1. A valve for restricting a flow of a fluid through a channel, the valve comprising:
   an inflatable elastomeric valve seat;
   a gas control for selectively applying a flow of pressurized gas to the inflatable elastomeric valve seat and venting pressurized gas from the gas-inflatable elastomeric valve seat;
   a primary closing member for restricting the flow of the fluid in the channel by engaging with the inflatable elastomeric valve seat; and
   a valve control for selectively engaging the inflatable elastomeric valve seat and the primary closing member to control the flow of fluid through the channel, said valve control comprising a valve drive shaft for moving the primary closing member between an open position and a closed position, a gas control switch for controlling the gas control such that pressurized gas is supplied to the inflatable elastomeric valve seat when the gas control switch is engaged and gas is vented from the inflatable elastomeric valve seat when the gas control switch is disengaged, and a cam operably connected to a drive shaft such that the position of the cam rotates about an axis when the drive shaft is rotated wherein the cam is positioned to engage the gas control switch when the primary closing member is in a closed position and disengage the gas control switch when the primary closing member is not in the closed position
   wherein the valve control is further configured to control the gas control such that pressurized gas is automatically applied to the inflatable elastomeric valve seat when the valve control is operated to restrict the flow of fluid through the channel by engaging the inflatable elastomeric valve seat with the primary closing member.

2. The valve of claim 1 wherein the valve control is further configured to control the gas control such that pressurized gas is vented from the inflatable elastomeric valve seat when the valve control is operated to permit the flow of fluid through the channel by disengaging the inflatable elastomeric valve seat from the primary closing member.

3. The valve of claim 1 wherein the valve control further comprises a key and a keyway that cooperate with the drive shaft and the valve drive shaft to disengage the gas control switch prior to the valve drive shaft moving the primary closing member out of the closed position.

4. The valve of claim 1 wherein the valve control further comprises a handwheel attached to the drive shaft.

5. The valve of claim 4 wherein the handwheel is attached to the drive shaft through worm and wheel gearing such that mechanical forces placed on the primary closing member are reduced and transmitted to the handwheel.

6. The valve of claim 1 wherein the primary closing member further comprises a partial spherical valve member.

7. The valve of claim 1 further comprising instrumentation for measuring and monitoring the gas pressure in the inflatable elastomeric valve seat.

8. A hand-operated valve for controlling the flow of a fluid containing or consisting of particulate matter, the hand-operated valve comprising:
    an inflatable valve seat wherein the inflatable valve seat is selectively inflated by supplying pressurized gas;
    at least one control valve for controllably supplying pressurized gas to the inflatable valve seat and venting pressurized gas from the inflatable valve seat;
    a closing member for interacting with the inflatable valve seat to control the flow of the fluid;
    a control member for selectively moving the closing member between an open position and a closed position; and
    a compensation system operably connected to and being responsive to the control member for activating the control valve such that the inflatable valve seat is inflated when the closing member is in a closed position and the inflatable valve seat is deflated prior to moving the closing member from the closed position in response to a force applied to the control member in a direction for opening the closing member.

9. The hand-operated valve of claim 8 wherein the control member comprises a h and wheel attached to a drive shaft.

10. The hand-operated valve of claim 9 further comprising worm and wheel gearing that reduces forces acting upon the closing member as the forces are transmitted through the drive shaft to the hand wheel.

11. The hand-operated valve of claim 9 wherein the compensation system further comprises a cam secured to the drive shaft in a position such that the cam that activates the control valve to inflate the inflatable valve seat when the drive shaft is rotated to place the closing member in a sealed position.

12. The hand-operated valve of claim 11 wherein the compensation system further comprises a valve drive shaft, a key and a keyway that interact with the drive shaft and the cam such that pressurized gas is vented from the inflatable valve seat prior to the closing member being moved from a closed position.

13. The hand-operated valve of claim 8 further comprising a locking mechanism for locking the closing member in a desired position.

14. The hand-operated valve of claim 13 wherein the locking mechanism further comprises a frictional clutch or a locking pawl.

15. The hand-operated valve of claim 8 wherein the inflatable valve seat is constructed of an elastomeric material.

16. The hand-operated valve of claim 8 wherein the closing member further comprises a partial spherical valve member.

17. The hand-operated valve of claim 8 wherein the closing member further comprises a hemispherical valve member.

18. A method of closing and sealing a hand-operated valve used to control the flow of fluids containing or consisting of particulate matter, said method comprising:
    moving a closure member from an open position to a closed position wherein the closure member is positioned adjacent an inflatable elastomeric valve seat when in the closed position;
    automatically inflating the inflatable elastomeric valve seat with pressurized gas by mechanically engaging a pressurized gas supply switch with a cam once the closure member is in the closed position; and
    automatically deflating the inflatable elasotomeric valve seat by disengaging the cam from the pressurized gas supply switch and venting the pressurized gas from the inflatable elastomeric valve seat prior to moving the closure member to the open position.

19. The method of claim 18 wherein the step of automatically inflating the inflatable elastomeric valve seat further comprises delaying the automatic inflation of the inflatable valve seat for a predetermined period of time after the closure member is moved into the closed position.

20. A hand-operated valve for controlling the movement of a fluid that includes particulate matter through a channel, said hand-operated valve comprising:
    a partial spherical valve member having a valve drive shaft such that rotation of the valve drive shaft moves the partial spherical valve member between a closed position and an open position;
    an inflatable elastomeric valve seat for acting in conjunction with the partial spherical valve member to restrict the flow of fluid through the channel when the partial spherical valve member is in the closed position and the inflatable elastomeric valve seat is inflated with compressed gas;
    a gas supply activation switch for providing compressed gas to the inflatable elastomeric valve seat when the gas supply activation switch is engaged and venting compressed gas from the inflatable elastomeric valve seat when the gas supply activation switch is disengaged;
    a hand-operated wheel;
    a worm and wheel gear operatively connected to the hand-operated wheel;
    a drive shaft operably connected to the worm and wheel gear;
    a key mounted on the valve drive shaft; and
    a sleeve designed to be connected to the drive shaft wherein the sleeve has a cam on an outer surface and a keyway on an inner surface and the cam is positioned such that it engages the gas supply activation switch when the partial spherical valve member is rotated into the closed position and wherein the keyway is configured to receive the key mounted on the valve drive shaft such that, when the partial spherical valve member is rotated out of the closed position, the sleeve rotates and the cam disengages the gas supply activation switch before the key mounted on the valve drive shaft engages the keyway on the sleeve and rotates the valve drive shaft.

21. A ball valve for controlling the flow of fluids through a channel, said ball valve comprising:

a valve control member;

a drive shaft connected to the valve control member such that rotation of the hand-operated valve control rotates the drive shaft;

a ball closure member wherein the ball closure member can be rotated between a closed position and an open position;

a valve drive shaft for rotating the ball closure member between the closed and the open position wherein a key is mounted on the valve drive shaft;

a pair of inflatable seals for interacting with the ball closure member such that a seal is formed between the ball closure member and the inflatable seals when the inflatable seals are inflated with compressed gas and wherein one of the inflatable seals is positioned adjacent an inlet port of the valve and one of the inflatable seals is positioned adjacent an outlet port of the valve;

a gas supply activation switch for supplying compressed gas to the pair of inflatable seals when the gas supply activation switch is engaged and venting compressed gas from the inflatable seals when the gas supply activation switch is disengaged; and a sleeve designed to be connected to the drive shaft wherein the sleeve has a cam on an outer surface and a keyway on an inner surface and the cam is positioned such that it engages the gas supply activation switch when the ball closure member is rotated into the closed position and wherein the keyway is configured to receive the key mounted on the valve drive shaft such that, when the ball closure member is rotated out of the closed position, the sleeve rotates and the cam disengages the gas supply activation switch before the key mounted on the valve drive shaft engages the keyway on the sleeve and rotates the valve drive shaft.

22. The ball valve of claim 21 further comprising a locking mechanism for locking the ball closure member in a desired position.

23. The ball valve of claim 21 further comprising worm and wheel gearing that reduces forces acting upon the ball closure member as the forces are transmitted through the drive shafts to the valve control member.

* * * * *

UNITED STATES PATENT AND TRADEMARK OFFICE
CERTIFICATE OF CORRECTION

| | |
|---|---|
| PATENT NO. | : 6,805,332 B2 |
| DATED | : October 19, 2004 |
| INVENTOR(S) | : Michael F. Crawley |

It is certified that error appears in the above-identified patent and that said Letters Patent is hereby corrected as shown below:

The title page, showing an illustrative figure, should be deleted and substitute therefor the attached title page.

Delete Drawing Sheets 1-7 and substitute therefor the Drawing Sheets consisting of FIG 1-7 as shown on the attached pages <u>Column 8,</u>
Lines 49-50, after "member" and before "compensation", delete "movemenmt" and insert therefore -- movement --.

<u>Column 11,</u>
Line 51, after "comprises a" and before "attached", delete "h and wheel" and insert therefor -- handwheel --.

Signed and Sealed this

Fifth Day of July, 2005

JON W. DUDAS
*Director of the United States Patent and Trademark Office*

(12) United States Patent  
Crawley

(10) Patent No.: US 6,805,332 B2  
(45) Date of Patent: Oct. 19, 2004

(54) INFLATABLE SEAT VALVE

(76) Inventor: Michael F. Crawley, 317 Calderwood Hwy., Maryville, TN (US) 37801

(*) Notice: Subject to any disclaimer, the term of this patent is extended or adjusted under 35 U.S.C. 154(b) by 113 days.

(21) Appl. No.: 10/113,021

(22) Filed: Mar. 29, 2002

(65) Prior Publication Data

US 2003/0183796 A1 Oct. 2, 2003

(51) Int. Cl.[7] .............................................. F16K 25/00
(52) U.S. Cl. ................................... 251/172; 251/249.5
(58) Field of Search .............................. 251/170, 172, 251/175, 192, 248, 249.5, 315.01

(56) References Cited

U.S. PATENT DOCUMENTS

| | | |
|---|---|---|
| 2,705,016 A | 3/1955 | Saar |
| 4,137,935 A | 2/1979 | Snowdon |
| 4,292,992 A | 10/1981 | Bhide |
| 4,353,388 A | 10/1982 | Isoyama et al. |
| 4,583,568 A * | 4/1986 | Yamakawa et al. .......... 137/240 |
| 4,688,594 A | 8/1987 | Gardner |
| 4,715,400 A | 12/1987 | Gardner et al. |
| 5,642,751 A | 7/1997 | Crawley |
| 5,717,135 A * | 2/1998 | Fiorletta et al. ............ 73/146.5 |

OTHER PUBLICATIONS

Macawber—Denseveyor brochure, 4 pages, 1975.

* cited by examiner

Primary Examiner—Edward K. Look  
Assistant Examiner—John K. Fristoe, Jr.  
(74) Attorney, Agent, or Firm—Luedeka, Neely & Graham, P.C.

(57) ABSTRACT

A hand-operated hemispherical or spherical valve that provides an improved seal when dealing with fluids containing, or consisting entirely of, particulate matter is provided by the present invention. The valve utilizes an inflatable elastomeric valve seat that interacts with a primary closing member to permit or restrain the flow of fluids or particulate matter in a channel. The valve is opened and closed by turning a handwheel that is connected to a drive shaft. A sleeve having a cam is mounted on the drive shaft such that the cam engages a pressurized gas supply switch that inflates the inflatable elastomeric valve seat or seats when the hand wheel is turned to a closed position. Conversely, when the hand wheel is turned to an open position, a valve drive shaft, key and keyway function in conjunction with the drive shaft to turn the sleeve and disengage the cam such that the elastomeric valve seats are deflated prior to the primary closing member moving out of the closed position.

23 Claims, 8 Drawing Sheets

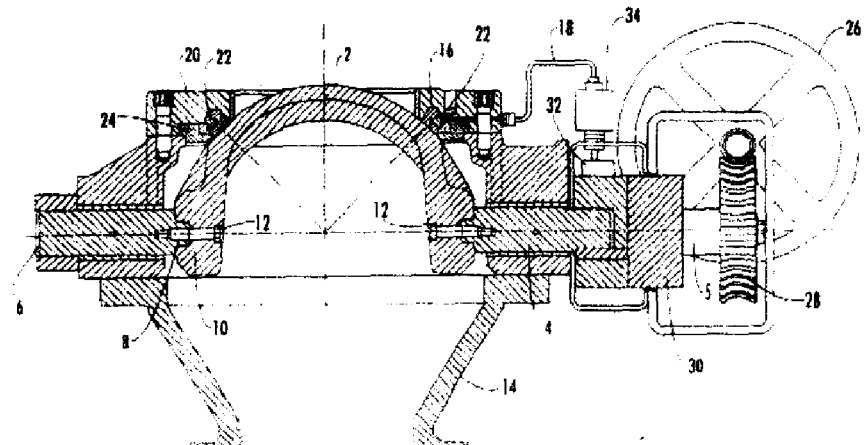

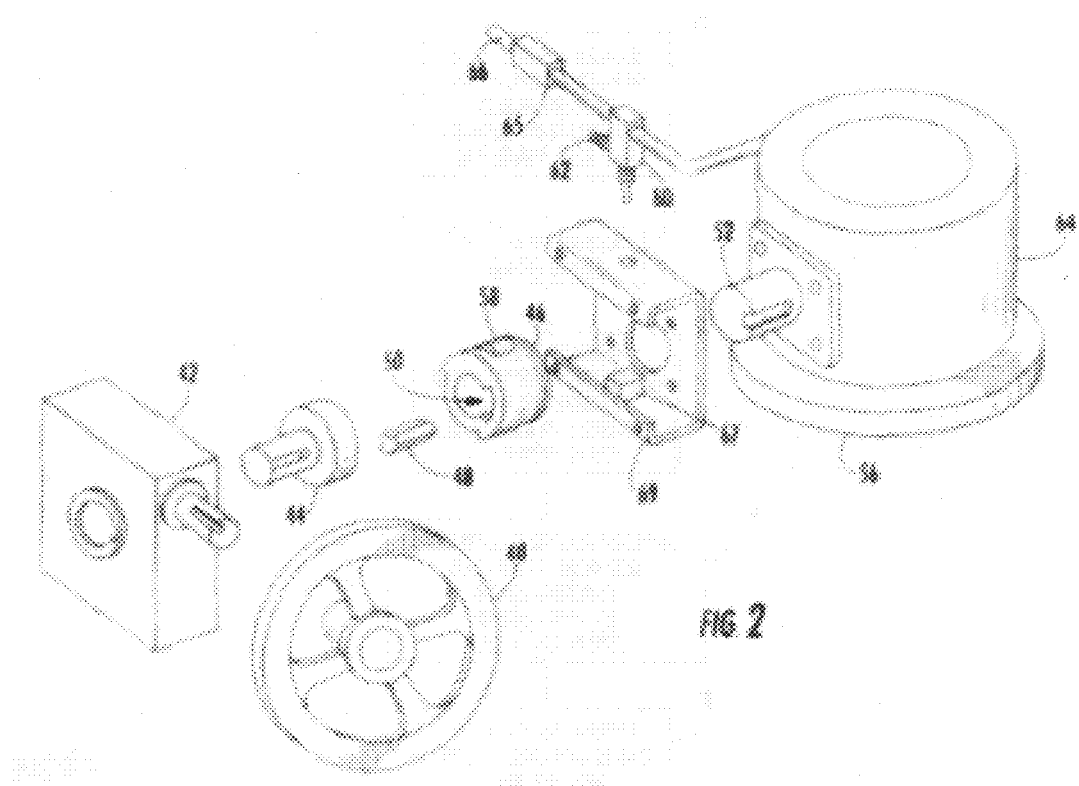

UNITED STATES PATENT AND TRADEMARK OFFICE
CERTIFICATE OF CORRECTION

| | | |
|---|---|---|
| PATENT NO. | : 6,805,332 B2 | Page 1 of 10 |
| APPLICATION NO. | : 10/113021 | |
| DATED | : October 19, 2004 | |
| INVENTOR(S) | : Michael F. Crawley | |

It is certified that error appears in the above-identified patent and that said Letters Patent is hereby corrected as shown below:

The title page, showing an illustrative figure, should be deleted and substitute therefor the attached title page.

Delete Drawing Sheets 1-7 and substitute therefor the Drawing Sheets consisting of FIG 1-7 as shown on the attached pages Column 8,
Lines 49-50, after "member" and before "compensation", delete "movemenmt" and insert therefore -- movement --.

Column 11,
Line 51, after "comprises a" and before "attached", delete "h and wheel" and insert therefor -- handwheel --.

This certificate supersedes Certificate of Correction issued July 5, 2005.

Signed and Sealed this

First Day of May, 2007

JON W. DUDAS
*Director of the United States Patent and Trademark Office*

(12) United States Patent
Crawley

(10) Patent No.: US 6,805,332 B2
(45) Date of Patent: Oct. 19, 2004

(54) INFLATABLE SEAT VALVE

(76) Inventor: Michael F. Crawley, 317 Calderwood Hwy., Maryville, TN (US) 37801

(*) Notice: Subject to any disclaimer, the term of this patent is extended or adjusted under 35 U.S.C. 154(b) by 113 days.

(21) Appl. No.: 10/113,021

(22) Filed: Mar. 29, 2002

(65) Prior Publication Data
US 2003/0183796 A1 Oct. 2, 2003

(51) Int. Cl.$^7$ ................................ F16K 25/00
(52) U.S. Cl. ........................... 251/172; 251/249.5
(58) Field of Search ........................ 251/170, 172, 251/175, 192, 248, 249.5, 315.01

(56) References Cited

U.S. PATENT DOCUMENTS

| | | |
|---|---|---|
| 2,705,016 A | 3/1955 | Saar |
| 4,137,935 A | 2/1979 | Snowdon |
| 4,292,992 A | 10/1981 | Bhide |
| 4,353,388 A | 10/1982 | Isoyama et al. |
| 4,583,568 A * | 4/1986 | Yamakawa et al. .......... 137/240 |
| 4,688,594 A | 8/1987 | Gardner |
| 4,715,400 A | 12/1987 | Gardner et al. |
| 5,642,751 A | 7/1997 | Crawley |
| 5,717,135 A * | 2/1998 | Fiorletta et al. .......... 73/146.5 |

OTHER PUBLICATIONS

Macawber—Denseveyor brochure, 4 pages, 1975.

* cited by examiner

*Primary Examiner*—Edward K. Look
*Assistant Examiner*—John K. Fristoe, Jr.
(74) *Attorney, Agent, or Firm*—Luedeka, Neely & Graham, P.C.

(57) ABSTRACT

A hand-operated hemispherical or spherical valve that provides an improved seal when dealing with fluids containing, or consisting entirely of, particulate matter is provided by the present invention. The valve utilizes an inflatable elastomeric valve seat that interacts with a primary closing member to permit or restrain the flow of fluids or particulate matter in a channel. The valve is opened and closed by turning a handwheel that is connected to a drive shaft. A sleeve having a cam is mounted on the drive shaft such that the cam engages a pressurized gas supply switch that inflates the inflatable elastomeric valve seat or seats when the hand wheel is turned to a closed position. Conversely, when the hand wheel is turned to an open position, a valve drive shaft, key and keyway function in conjunction with the drive shaft to turn the sleeve and disengage the cam such that the elastomeric valve seats are deflated prior to the primary closing member moving out of the closed position.

23 Claims, 8 Drawing Sheets